United States Patent
Hamada

(10) Patent No.: US 10,248,739 B2
(45) Date of Patent: Apr. 2, 2019

(54) APPARATUS, SYSTEM, AND METHOD OF PROCESSING LOG DATA, AND RECORDING MEDIUM STORING LOG DATA PROCESSING PROGRAM

(75) Inventor: Yuuta Hamada, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 1442 days.

(21) Appl. No.: 13/368,734

(22) Filed: Feb. 8, 2012

(65) Prior Publication Data

US 2012/0221715 A1 Aug. 30, 2012

(30) Foreign Application Priority Data

Feb. 28, 2011 (JP) .................................. 2011-042854
Aug. 31, 2011 (JP) .................................. 2011-189157

(51) Int. Cl.
*G06F 17/40* (2006.01)
*H04L 29/06* (2006.01)
(Continued)

(52) U.S. Cl.
CPC .............. *G06F 17/40* (2013.01); *G06F 17/30* (2013.01); *G06F 17/30533* (2013.01);
(Continued)

(58) Field of Classification Search
CPC ....... H04L 43/04; H04L 43/08; H04L 12/581; H04L 12/5835; H04L 29/06027; H04L 51/36; H04L 12/1818; H04L 65/403; H04L 12/1813; H04L 67/22; H04L 41/044; H04L 41/0806; H04W 8/18; H04W 8/22; G06F 21/35; G06F 17/30979; G06F 11/3068; G06F 17/30985; G06F 11/3476; G06F 17/30; G06F 17/30551; G06F 17/40; H04N 7/155

See application file for complete search history.

(56) References Cited

U.S. PATENT DOCUMENTS 6,338,066 B1 * 1/2002 Martin ................ G06F 17/3089
                                                                 707/708
6,938,089 B1 * 8/2005 Slaby .................. H04L 41/0806
                                                                 709/203
(Continued)

FOREIGN PATENT DOCUMENTS

JP          8-106408        4/1996
JP          9-326793        12/1997
(Continued)

OTHER PUBLICATIONS

U.S. Appl. No. 13/070,027, filed Mar. 23, 2011, Yuuta Hamada.
Office Action dated Mar. 24 2015 in Japanese Patent Application No. 2011-189157.

*Primary Examiner* — Ramy M Osman
(74) *Attorney, Agent, or Firm* — Oblon, McClelland, Maier & Neustadt, L.L.P.

(57) ABSTRACT

An management system stores information including communication state data indicating a communication state of a terminal as raw log data, and applies format processing to the raw log data to generate formatted log data before a request for obtaining communications log information of the terminal is received. When the request is received, the management system searches the formatted log data to obtain formatted log data that matches the request.

20 Claims, 16 Drawing Sheets

(51) Int. Cl.
*G06F 17/30* (2006.01)
*H04L 29/08* (2006.01)

(52) U.S. Cl.
CPC .... *G06F 17/30551* (2013.01); *H04L 65/1066* (2013.01); *H04L 65/1069* (2013.01); *H04L 65/1086* (2013.01); *H04L 67/22* (2013.01); *H04L 67/32* (2013.01)

(56) References Cited

U.S. PATENT DOCUMENTS

| | | | | |
|---|---|---|---|---|
| 7,779,021 | B1* | 8/2010 | Smith | G06F 11/3476 707/760 |
| 8,723,914 | B2* | 5/2014 | Mackie et al. | 348/14.07 |
| 9,300,913 | B2* | 3/2016 | Hamada | H04L 65/4038 |
| 9,825,999 | B2* | 11/2017 | Hamada | H04L 65/1069 |
| 10,019,226 | B2* | 7/2018 | Carasso | G06F 17/30551 |
| 2003/0167259 | A1* | 9/2003 | Casson | C09D 11/037 |
| 2003/0169330 | A1* | 9/2003 | Ben-Shachar | H04N 7/152 348/14.09 |
| 2005/0021885 | A1* | 1/2005 | Anderson et al. | 710/29 |
| 2005/0091311 | A1* | 4/2005 | Lund et al. | 709/203 |
| 2005/0114321 | A1* | 5/2005 | DeStefano | H04L 43/02 |
| 2005/0114708 | A1* | 5/2005 | DeStefano | H04L 41/044 726/4 |
| 2005/0216462 | A1* | 9/2005 | Xiao | G06F 17/30533 |
| 2007/0038889 | A1* | 2/2007 | Wiggins et al. | 714/20 |
| 2007/0118301 | A1* | 5/2007 | Andarawis | G05B 23/0221 702/33 |
| 2008/0033757 | A1* | 2/2008 | Kozloff | G06Q 10/00 705/2 |
| 2008/0228736 | A1* | 9/2008 | Brandt | H04M 3/2218 |
| 2009/0055523 | A1* | 2/2009 | Song et al. | 709/224 |
| 2009/0094534 | A1* | 4/2009 | Murai | H04L 12/1827 715/753 |
| 2009/0252159 | A1* | 10/2009 | Lawson | H04M 7/0021 370/352 |
| 2009/0265424 | A1* | 10/2009 | Kimoto | G06F 11/3476 709/203 |
| 2009/0319941 | A1* | 12/2009 | Laansoo | G06Q 10/107 715/784 |
| 2011/0246644 | A1* | 10/2011 | Hamada | H04L 43/0811 709/224 |
| 2012/0221715 | A1* | 8/2012 | Hamada | H04L 67/22 709/224 |
| 2012/0246116 | A1* | 9/2012 | Yang | G06F 17/30581 707/634 |

FOREIGN PATENT DOCUMENTS

| | | |
|---|---|---|
| JP | 2000-81971 | 3/2000 |
| JP | 2004-227360 | 8/2004 |
| JP | 2004-318308 | 11/2004 |
| JP | 2006-259811 | 9/2006 |
| JP | 2006-279636 | 10/2006 |
| JP | 2008-48047 | 2/2008 |

* cited by examiner

FORMAT RULE MANAGEMENT TABLE T

| FORMAT START CONDITION (COMMUNICATION STATE) | FORMATTED DATA TABLE | RECORD FOR FORMAT | FORMAT PROCESSING |
|---|---|---|---|
| COMMUNICATION STATE = "invite" | CONFERENCE LOG MANAGEMENT TABLE (t2) | RECORD WITH SAME CONFERENCE ID | CONFERENCE ID=CONFERENCE ID HOST TERMINAL ID =REQUEST TERMINAL ID |
| COMMUNICATION STATE = "start" | CONFERENCE LOG MANAGEMENT TABLE (t2) | RECORD WITH SAME CONFERENCE ID | CONFERENCE ID=CONFERENCE ID START DATE/TIME = COMMUNICATION DATE/TIME MEETING TIME = END DATE/TIME − COMMUNICATION DATE/TIME |
| COMMUNICATION STATE = "end" | CONFERENCE LOG MANAGEMENT TABLE (t2) | RECORD WITH SAME CONFERENCE ID | CONFERENCE ID=CONFERENCE ID END DATE/TIME = COMMUNICATION DATE/TIME MEETING TIME = COMMUNICATION DATE/TIME − START DATE/TIME |
| COMMUNICATION STATE = "join" | PARTICIPANT LOG MANAGEMENT TABLE (t1) | RECORD WITH SAME CONFERENCE SESSION ID | TERMINAL ID =REQUEST TERMINAL ID CONFERENCE ID=CONFERENCE ID CONFERENCE SESSION ID =CONFERENCE SESSION ID PARTICIPATED DATE/TIME = COMMUNICATION DATE/TIME PARTICIPATION TIME = (LEAVE DATE/TIME − COMMUNICATION DATE/TIME) LEAVE STATE = "MEETING" |

FIG. 8B

| | PARTICIPANT LOG MANAGEMENT TABLE (t1) | |
|---|---|---|
| COMMUNICATION STATE = "leave" | RECORD WITH SAME CONFERENCE SESSION ID | TERMINAL ID =REQUEST TERMINAL ID CONFERENCE ID=CONFERENCE ID CONFERENCE SESSION ID =CONFERENCE SESSION ID PARTICIPATED DATE/TIME = COMMUNICATION DATE/TIME PARTICIPATION TIME = (COMMUNICATION DATE/TIME - JOIN DATE/TIME) LEAVE STATE = "LEAVE" |
| | RECORD WITH SAME CONFERENCE SESSION ID | TERMINAL ID =REQUEST TERMINAL ID CONFERENCE ID=CONFERENCE ID CONFERENCE SESSION ID =CONFERENCE SESSION ID PARTICIPATED DATE/TIME = COMMUNICATION DATE/TIME PARTICIPATION TIME = (COMMUNICATION DATE/TIME - JOIN DATE/TIME) LEAVE STATE = "FORCED QUIT" |
| | ... | ... |
| COMMUNICATION STATE = "offline" CONFERENCE ID!=null CONFERENCE SESSION ID!=null | ... | ... |
| ... | ... | |

FIG. 9

RAW LOG INFORMATION

| COMMUNI-CATION STATE | REQUEST TERMINAL ID | COUNTER-PART TERMINAL ID | SESSION ID | CONFERENCE ID | CONFERENCE SESSION ID | COMMUNICATION DATE |
|---|---|---|---|---|---|---|
| online | 110001 | – | se001 | – | – | 2010-09-01 09:30:00 |
| online | 110002 | – | se002 | – | – | 2010-09-01 09:30:00 |
| online | 110003 | – | se003 | – | – | 2010-09-01 09:30:00 |
| invite | 110001 | 110002 | – | conf001 | – | 2010-09-01 09:59:50 |
| accept | 110002 | 110001 | – | conf001 | – | 2010-09-01 09:59:59 |
| start | 110001 | – | – | conf001 | – | 2010-09-01 10:00:00 |
| join | 110001 | – | – | conf001 | cse001 | 2010-09-01 10:00:00 |
| join | 110002 | – | – | conf001 | cse002 | 2010-09-01 10:00:00 |
| call | 110003 | 110001 | – | conf001 | – | 2010-09-01 10:09:50 |
| accept | 110001 | 110003 | – | conf001 | – | 2010-09-01 10:09:59 |
| join | 110003 | – | – | conf001 | cse003 | 2010-09-01 10:10:00 |
| leave | 110002 | – | – | conf001 | cse002 | 2010-09-01 10:40:00 |
| offline | 110003 | – | se003 | conf001 | cse003 | 2010-09-01 11:30:25 |
| leave | 110001 | – | – | conf001 | cse001 | 2010-09-01 11:30:25 |
| end | 110001 | – | – | conf001 | – | 2010-09-01 11:30:25 |
| offline | 110001 | – | se001 | – | – | 2010-09-01 11:35:00 |
| offline | 110002 | – | se002 | – | – | 2010-09-01 11:40:00 |
| ... | ... | ... | ... | ... | ... | ... |
| online | 110005 | – | se005 | – | – | 2010-09-12 14:20:00 |
| online | 110006 | – | se006 | – | – | 2010-09-12 14:21:00 |
| invite | 110005 | 110006 | – | conf002 | – | 2010-09-12 14:29:50 |
| accept | 110006 | 110005 | – | conf002 | – | 2010-09-12 14:29:55 |
| start | 110005 | – | – | conf002 | – | 2010-09-12 14:30:00 |
| join | 110005 | – | – | conf002 | cse005 | 2010-09-12 14:30:00 |
| ... | ... | ... | ... | ... | ... | ... |

FIG. 10A

PARTICIPANT LOG MANAGEMENT TABLE t1

| LOG ID | TERMINAL ID | CON-FERENCE ID | CON-FERENCE SESSION ID | PARTICI-PATED DATE/TIME | LEAVE DATE/TIME | PARTICI-PATION TIME | LEAVE STATE |
|---|---|---|---|---|---|---|---|
| 001 | 110001 | conf001 | cse001 | 2010-09-01 10:00:00 | 2010-09-01 11:30:25 | 01:30:25 | LEAVE |
| 002 | 110002 | conf001 | cse002 | 2010-09-01 10:00:00 | 2010-09-01 10:40:00 | 00:40:00 | LEAVE |
| 003 | 110003 | conf001 | cse003 | 2010-09-01 10:00:00 | 2010-09-01 11:30:25 | 01:20:25 | FORCED QUIT |
| 004 | 110005 | conf002 | cse005 | 2010-09-12 14:30:00 | – | – | MEETING |
| ... | ... | ... | ... | ... | ... | ... | ... |

FIG. 10B

CONFERENCE LOG MANAGEMENT TABLE t2

| CONFERENCE ID | HOST TERMINAL ID | START DATE/TIME | END DATE/TIME | MEETING TIME |
|---|---|---|---|---|
| conf001 | 110001 | 2010-09-01 10:00:00 | 2010-09-01 11:30:25 | 01:30:25 |
| conf002 | 110005 | 2010-09-12 14:30:00 | – | – |
| ... | ... | ... | ... | ... |

FIG. 13B

SEARCH CONDITION A : (TERMINAL ID = REQUEST TERMINAL ID) && (from_date ≦ PARTICIPATED DATE/TIME) && (PARTICIPATED DATE/TIME < to_date)

SEARCH CONDITION B : (TERMINAL ID = REQUEST TERMINAL ID) && (from_date ≦ LEAVE DATE/TIME) && (LEAVE DATE/TIME < to_date)

SEARCH CONDITION C : (TERMINAL ID = REQUEST TERMINAL ID) && (LEAVE STATE = "MEETING") && (PARTICIPATED DATE/TIME < to_date)

SEARCH CONDITION D : (TERMINAL ID = REQUEST TERMINAL ID) && (PARTICIPATED TIME ≧ to_date-from_date) && (PARTICIPATED DATE/TIME < from_date) && (LEAVE DATE/TIME ≧ to_date)

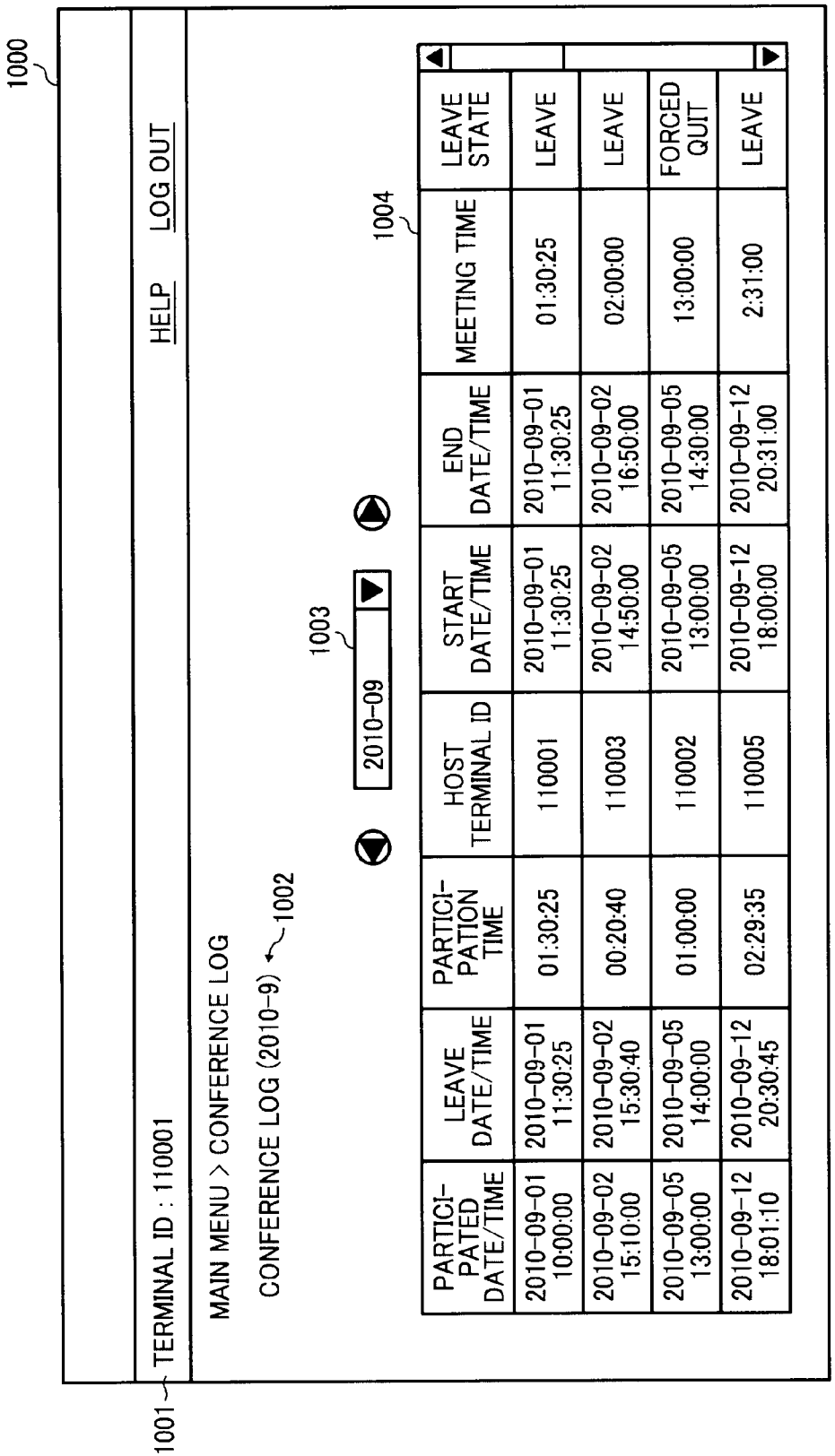

FIG. 15A

PARTICIPANT LOG MANAGEMENT TABLE t11

| LOG ID | TERMINAL ID | CON-FERENCE ID | CON-FERENCE SESSION ID | PARTICI-PATED DATE/TIME | LEAVE DATE/TIME | PARTICI-PATION TIME | LEAVE STATE | INCOMPLETE FLAG |
|---|---|---|---|---|---|---|---|---|
| 001 | 110001 | conf001 | cse001 | 2010-09-01 10:00:00 | 2010-09-01 11:30:25 | 01:30:25 | LEAVE | 0 |
| 002 | 110002 | conf001 | cse002 | 2010-09-01 10:00:00 | 2010-09-01 10:40:00 | 00:40:00 | LEAVE | 0 |
| 003 | 110003 | conf001 | cse003 | 2010-09-01 10:10:00 | 2010-09-01 11:30:25 | 01:20:25 | FORCED QUIT | 0 |
| 004 | 110005 | conf002 | cse005 | 2010-09-12 14:30:00 | – | – | MEETING | 0 |
| ⋮ | ⋮ | ⋮ | ⋮ | ⋮ | ⋮ | ⋮ | ⋮ | ⋮ |

FIG. 15B

CONFERENCE LOG MANAGEMENT TABLE t12

| CONFERENCE ID | HOST TERMINAL ID | START DATE/TIME | END DATE/TIME | MEETING TIME | INCOMPLETE FLAG |
|---|---|---|---|---|---|
| conf001 | 110001 | 2010-09-01 10:00:00 | 2010-09-01 11:30:25 | 01:30:25 | 0 |
| conf002 | 110005 | 2010-09-12 14:30:00 | – | – | 0 |
| ⋮ | ⋮ | ⋮ | ⋮ | ⋮ | ⋮ |

APPARATUS, SYSTEM, AND METHOD OF PROCESSING LOG DATA, AND RECORDING MEDIUM STORING LOG DATA PROCESSING PROGRAM

CROSS-REFERENCE TO RELATED APPLICATIONS

This patent application is based on and claims priority pursuant to 35 U.S.C. § 119 to Japanese Patent Application Nos. 2011-042854, filed on Feb. 28, 2011, and 2011-189157, filed on Aug. 31, 2011, in the Japan Patent Office, the entire disclosure of which is hereby incorporated herein by reference.

BACKGROUND

Field

The present invention generally relates to processing log data regarding communications performed or being performed among a plurality of communication terminals.

Background

The recent communication systems such as videoconference systems or teleconference systems allow a plurality of users, who are remotely located, to communicate with one another through a network. The services provider of the communication systems is often requested by a user to provide a report showing the communications log of the user. However, it has been cumbersome to generate a report for a specific user for a specific range of time, as the communication systems usually manage log information for a large number of users and a large number of devices over a long time period.

SUMMARY

In view of the above, one aspect of the present invention is to provide an apparatus, system, method, and a recording medium storing instructions, which processes raw log data into formatted log data without waiting for a user request for providing communications log information. When the user request is received, the formatted log data that is already prepared may be provided to the user.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 8A and 8B are an example data structure of a format rule management table, managed by the management system of FIG. 7;

FIG. 9 is an example data structure of row log data, managed by the management system of FIG. 7;

FIG. 10A is an example data structure of a participant log management table, managed by the management system of FIG. 7;

FIG. 10B is an example data structure of a conference log management table, managed by the management system of FIG. 7;

FIG. 13B is an illustration for explaining a search condition for searching the formatted log data to generate communications log information for the specific time range;

FIG. 14 is an example screen showing communications log information for the specific time range;

FIG. 15A is an example data structure of a participant log management table, managed by the management system of FIG. 7; and FIG. 15B is an example data structure of a conference log management table, managed by the management system of FIG. 7.

Figure 1:
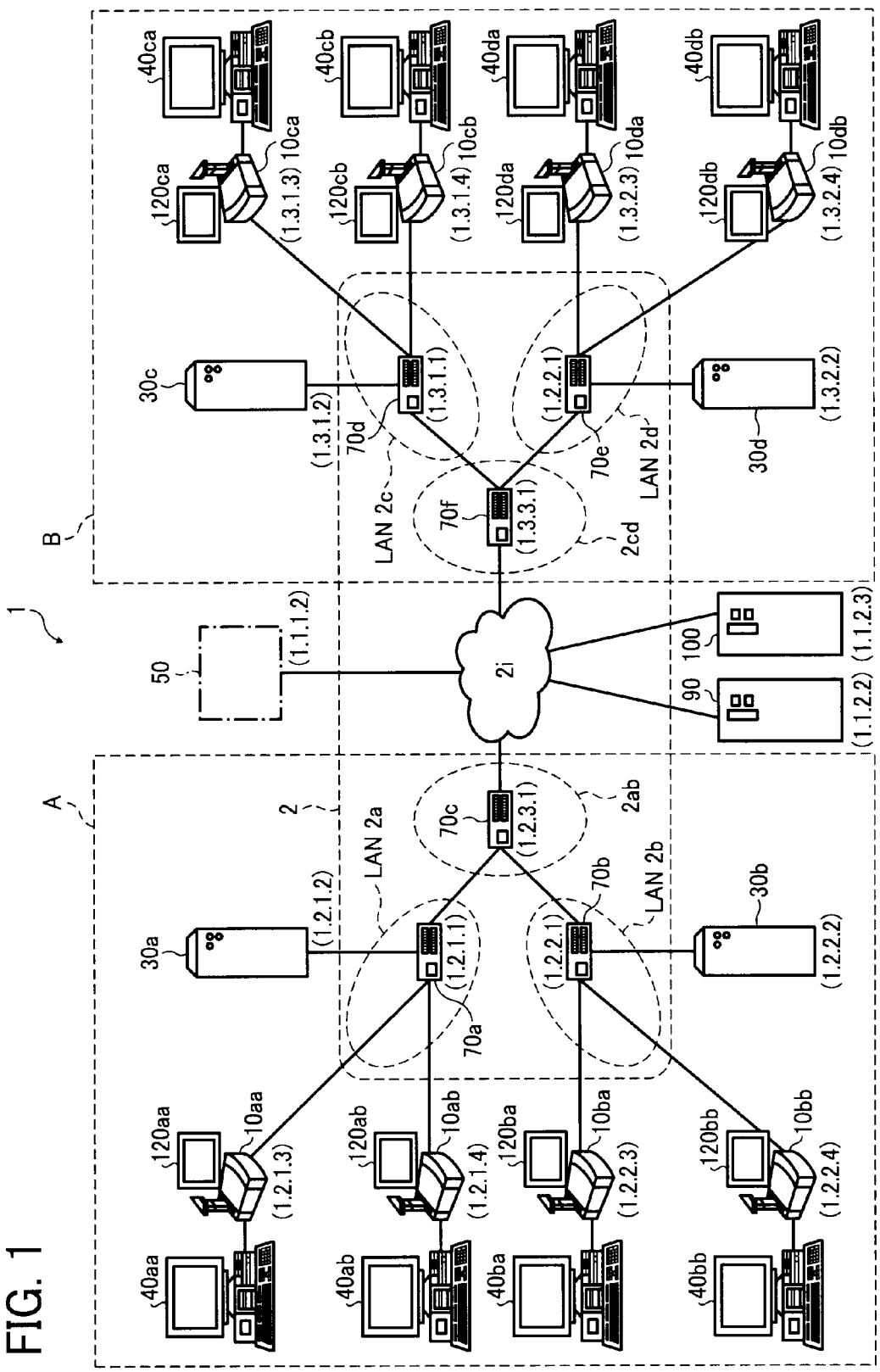
FIG. 1 is a schematic block diagram illustrating a configuration of a communication system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

FIG. 1 illustrates a configuration of a communication system according to an example embodiment of the present invention. In one example, the communication system 1 functions as a data providing system that transmits contents data from one communication terminal to another communication terminal in one direction through a communication management system 50. In another example, the communication system 1 functions as a two-way communication system that exchanges various information including image data and/or sound data that is used to convey human's feelings between or among two or more of a plurality of communication terminals 10, through the communication management system 50. The communication system 1 may be implemented as a videoconference system, video teleconference system, voice conference system, voice teleconference system, or personal computer screen sharing system.

In the following examples, it is assumed that the communication system 1 of FIG. 1 is implemented as the videoconference system, which is one example structure of the communication system. Based on this assumption, the communication management system 50 is implemented as the videoconference communication management system, which is one example structure of the communication management system. Further, the communication terminal 10 is implemented as the videoconference communication terminal, which is one example structure of the communication terminal. However, the use of communication system 1 is not limited to the following examples such that the communication system 1 may be implemented as various types of communication system as described above.

The communication system 1 of FIG. 1 includes a plurality of communication terminal 10aa, 10ab, 10ba, 10bb, 10ca, 10cb, 10da, and 10db, and a plurality of displays 120aa, 120ab, 120ba, 120bb, 120ca, 120cb, 120da, and 120db, a plurality of external input apparatuses 40aa, 40ab, 40ba, 40bb, 40ca, 40cb, 40da, and 40db each implementing as a client PC, a plurality of relay terminals 30a, 30b, 30c, and 30d, a communication management system 50, a program providing system 90, and a maintenance system 100.

The communication terminal 10 transmits or receives contents data such as image data and/or sound data to or from another communication terminal 10.

For the descriptive purposes, in this example, any number of the plurality of terminals 10aa to 10db may be collectively or each referred to as the terminal 10. Any number of the plurality of displays 120aa to 120db may be collectively or each referred to as the display 120. Any number of the plurality of input apparatuses 40aa to 40db may be collectively or each referred to as the input apparatus 40. Any number of the plurality of relay terminals 30a, 30b, 30c, and 30d may be collectively or each referred to as the relay terminal 30. The communication management system 50 may be referred to as the "management system" 50.

In this example, the terminal 10 that transmits a request to the management system 50 is referred to as the request terminal 10A. For example, the request terminal 10A includes any terminal 10 that sends a request for starting videoconference to another terminal 10 through the management system 50. The counterpart terminal 10B includes any terminal 10 that sends a response to the request for starting videoconference to the request terminal 10A through the management system 50. In another example, the request terminal 10A includes any terminal 10 that sends a request to cause the management system 50 to perform specific processing, for example, a request for obtaining communications log information of the terminal 10.

Figure 2:
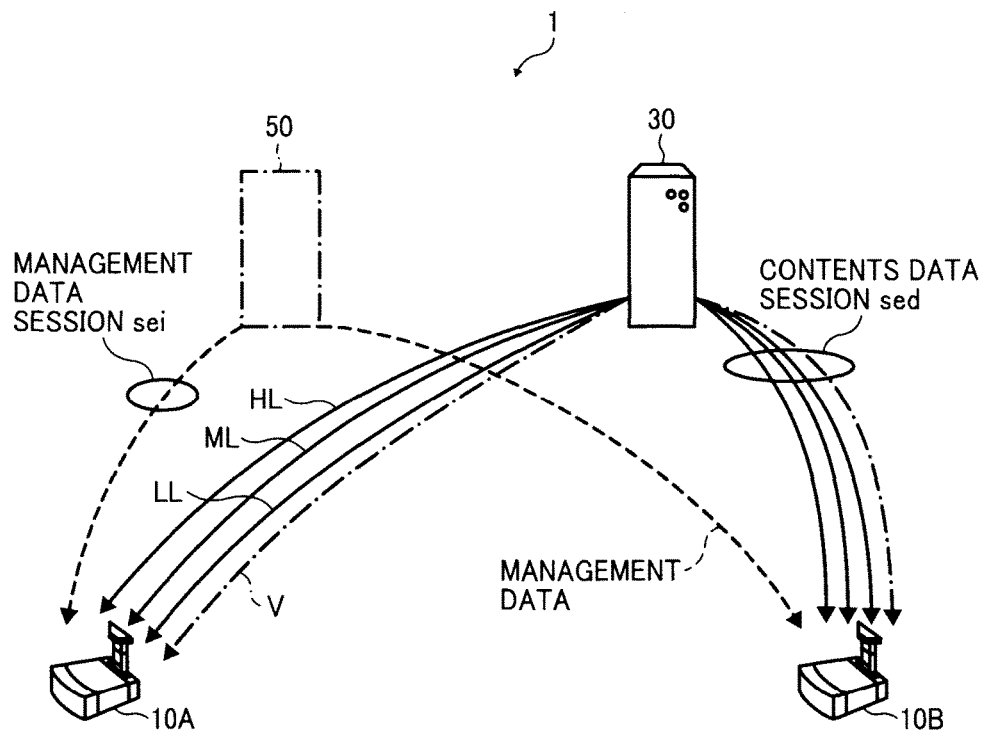
FIG. 2 is an illustration for explaining transmission or reception of data such as image data, sound data, or management data, performed by the communication system of FIG. 1.

As illustrated in FIG. 2, in the communication system 1, the request terminal 10A and the counterpart terminal 10B first establish a management data session "sei" to start transmission and reception of various types of management data through the management system 50. Further, in this example, the request terminal 10A and the counterpart terminal 10B establish four contents data sessions "sed" to transmit or receive contents data through the relay terminal 30. The four contents data sessions include a session "HL" to transmit high-level resolution image data HL, a session "ML" to transmit medium-level resolution image data ML, a session "LL" to transmit low-level resolution image data LL, and a session "V" to transmit sound data V such as voice data V. In this example, these four contents data sessions may be referred to as image and/or sound data sessions.

Figure 3A:
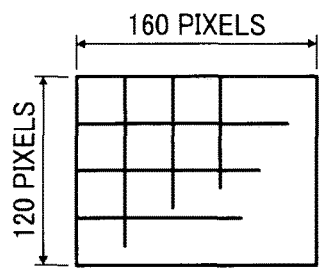
FIGS. 3A to 3C are illustrations for explaining image quality of image data transmitted or received by the communication system of FIG. 1.
Figure 3B:
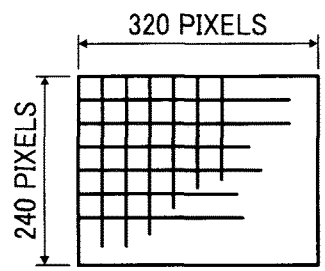
Figure 3C:
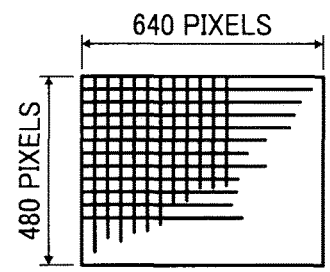

Referring now to FIGS. 3A to 3C, various image data having different resolution levels, which are respectively transmitted by the terminal 10 of the communication system 1, are explained. Referring to FIG. 3A, the low-level resolution image data, which functions as a base image, has 160 pixels in the horizontal direction and 120 pixels in the vertical direction. Referring to FIG. 3B, the medium-level resolution image data has 320 pixels in the horizontal direction and 240 pixels in the vertical direction. Referring to FIG. 3C, the high-level resolution image data has 640 pixels in the horizontal direction and 480 pixels in the vertical direction. In case of communicating with a narrow-band signal line, low-quality image data that is generated based on the low-level resolution image data, which is the base image, is transmitted. In case of communicating with a wideband signal line, medium-quality image data that is generated based on the low-level resolution image data and the medium-level resolution image data is transmitted. In case of communicating with a broadband signal line, high-quality image data that is generated based on the low-level resolution image data, the medium-level resolution image data, and the high-level resolution image data is transmitted. Any one of the above-described types of image data may be transmitted together with sound data such as voice data.

Referring back to FIG. 1, the relay terminal 30 relays contents data such as image data or sound data between or among the terminals 10. The management system 50 centrally manages various information such as login information of the terminal 10, the communication state of the terminal 10, candidate list information, communication log information, and the communication state of the relay terminal 30. In this example, it is assumed that a moving image is transmitted as the image data. Alternatively, a still image, or both of the still image and the moving image, may be transmitted as the image data.

The plurality of routers 70a to 70f, which may be collectively or each referred to as the router 70, selects a route that is most suitable for transmitting contents data such as image data and sound data.

The program providing system 90 includes a hard disk device (HD) 204 (FIG. 6), which stores a terminal control program that causes the terminal 10 to perform various functions or operations. For example, the program providing system 90 sends the terminal control program to the terminal 10 through the Internet 2i to cause the terminal 10 to install the terminal control program. Further, the HD 204 of the program providing system 90 may store a relay control program that causes the relay terminal 30 to perform various functions or operations. For example, the program providing system 90 sends the relay control program to the relay terminal 30 through the Internet 2i to cause the relay terminal 30 to install the relay control program. Further, the HD 204 of the program providing system 90 may store a communication management program that causes the management system 50 to perform various functions or operations. For example, the program providing system 90 sends the communication management program to the management system 50 to cause the management system 50 to install the communication management program. As described below, with the communication management program, the management system 50 manages various log data.

The maintenance system 100 is implemented as a computer capable of maintaining, managing, fixing, or upgrading at least one of the terminal 10, relay terminal 30, management system 50, and program providing system 90. Assuming that the maintenance system 100 is provided within a country, and the terminal 10, relay terminal 30, management system 50, and program providing system 90 are each installed outside the country, the maintenance system 100 maintains, manages, fixes, or upgrades at least one of the terminal 10, relay terminal 30, management system 30, and program providing system 90, remotely through the communication network 2. The maintenance system 100 may manage maintenance of at least one of the terminal 10, relay terminal 30, management system 50, and program providing system 90 without using the communication network 2. For example, a machine type number, a manufacturing number, customer information, maintenance and repair information, and failure log information may be maintained at the maintenance system 100 without using the communication network 2.

Still referring to FIG. 1, the terminals 10aa and 10ab, the relay terminal 30a, and the router 70a are connected to a local area network (LAN) 2a. The terminals 10ba and 10bb, the relay terminal 30b, and the router 70b are connected to a LAN 2b. The LAN 2a and the LAN 2b are connected to a leased line tab in which the router 70c is provided. It is assumed that these devices including the terminals 10aa to 10bb are located in an area A. For example, assuming that the area is any area in Japan, the LAN 2a could be located within an office in a city such as Tokyo, and the LAN 2b could be located within an office in another city such as Osaka.

The terminals 10ca and 10cb, the relay terminal 30c, and the router 70c are connected to a LAN 2c. The terminals 10da and 10db, the relay terminal 30d, and the router 70d are connected to a LAN 2d. The LAN 2c and the LAN 2d are connected to a leased line 2cd in which the router 70f is provided. It is assumed that these devices including the terminals 10ca to 10db are located in an area B apart from the area A. For example, assuming that the area is any area in the United States, the LAN 2c could be located within an office in a city such as New York, and the LAN 2d could be located within an office in another city such as Washington, D.C. The area A and the area B are connected through the Internet 2i, via the routers 70c and 70f.

The management system 50 and the program providing system 90 are connected through the Internet 2i to the terminal 10 and the relay terminal 30. Any one of the management system 50 and the program providing system 90 may be located at any location within or outside any one of the area A and the area B.

In this example, the communication network 2 includes the LAN 2a, LAN 2b, leased line tab, Internet 2i, leased line 2cd, LAN 2c, and LAN 2d. Any one or any portion of these lines or any other lines that may be included in the communication network 2 may be implemented as wired network or wireless network such as Wireless Fidelity (WiFi) network or Bluetooth network.

As shown in FIG. 1, the terminal 10, the relay terminal 30, the management system 50, the router 70, and the program providing system 90 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the IP address may be expressed in IPv6.

Further, in this example, the terminal 10 may be communicated in various ways. For example, at least two different terminals 10 that are located at different rooms in the same office, or at least two different terminals 10 that are located at different offices that are remotely located from one another, may communicate with one another. In another example, at least two different terminals 10 that are located in the same room may communicate with one another. In another example, one terminal 10 that is located indoor and another terminal 10 that is located outdoor, or at least two different terminals 10 that are both located outdoor, may communicate with one another. When the terminal 10 is located outdoor, the terminal 10 communicates with the other terminal 10 through a wireless network such as a wireless network designed for a mobile phone.

<Hardware Structure of Terminal>

Figure 4:
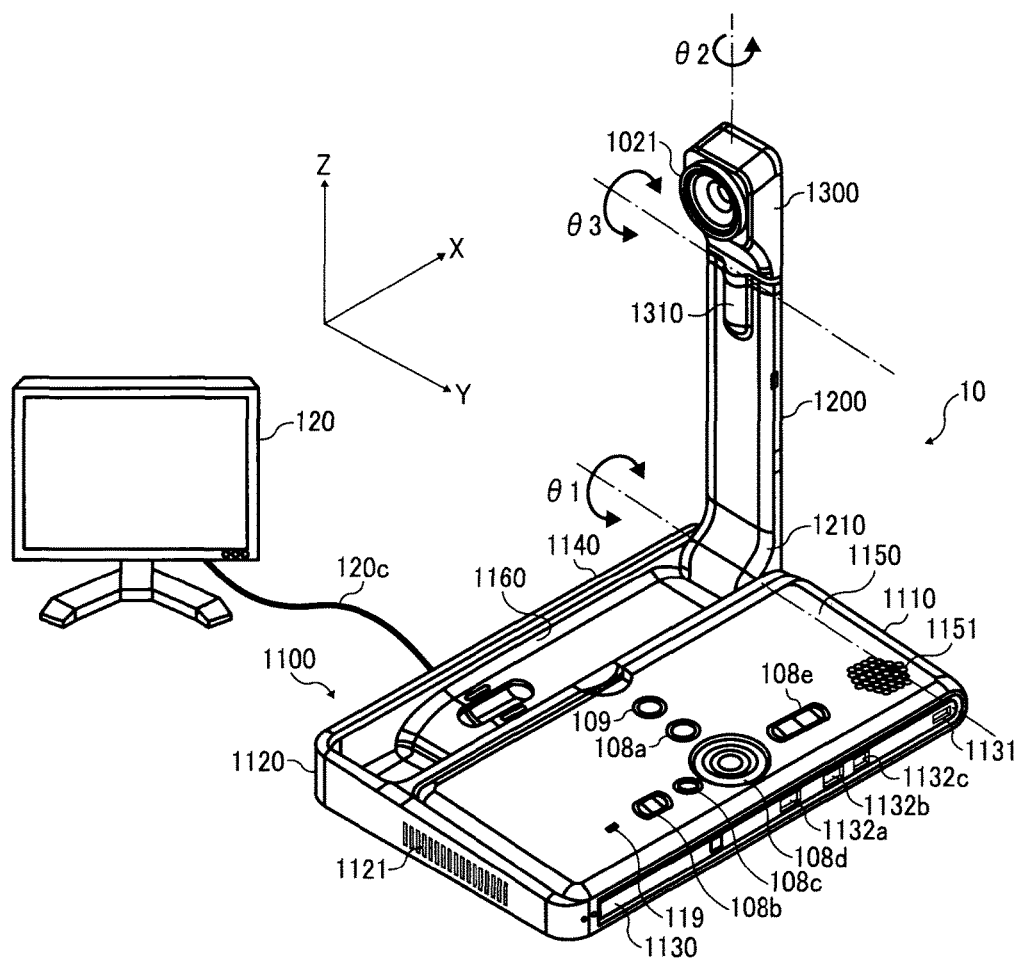
FIG. 4 is a perspective view illustrating the outer appearance of a communication terminal of the communication system of FIG. 1.

FIG. 4 is a perspective view illustrating the outer appearance of the communication terminal 10 of the communication system of FIG. 1. In FIG. 4, the longitudinal direction of the terminal 10 is referred to as x direction. The direction orthogonal to the x direction, which is the horizontal direction of the terminal 10, is referred to as the y direction. The direction orthogonal to the x direction and the y direction is referred to as the z direction.

As illustrated in FIG. 4, the terminal 10 includes a body 1100, an arm 1200, and a camera housing 1300. The body 1100 includes a back side wall 1110 having a plurality of air intake holes that are formed over the nearly entire surface of the intake surface of the back side wall 1110. The body 1100 further includes a front side wall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, a microphone 114 (FIG. 5) of the terminal 10 is able to catch sounds such as human voice or any sound including noise.

Figure 5:
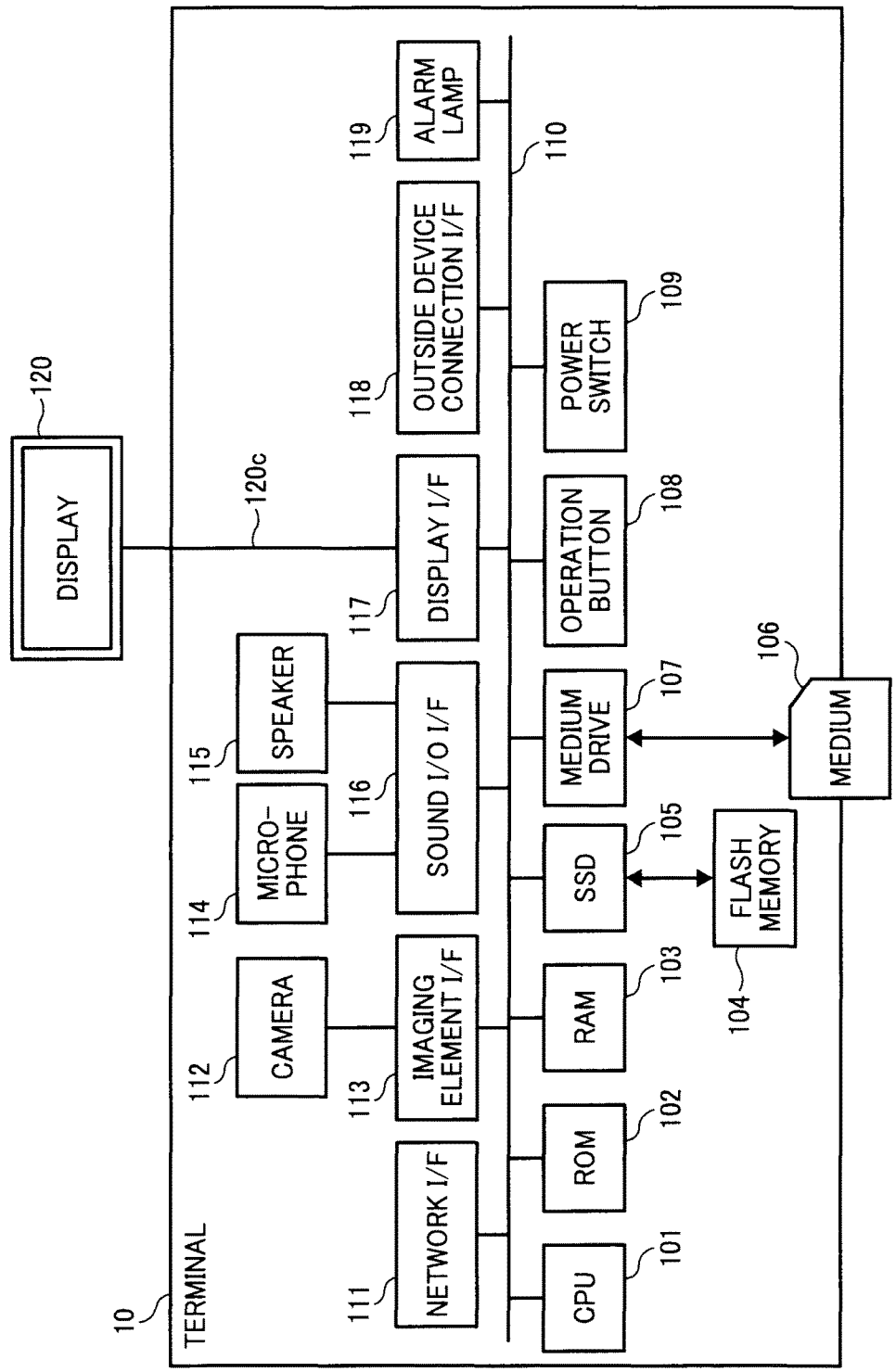
FIG. 5 is a schematic block diagram illustrating a hardware structure of the communication terminal of FIG. 1.

The body 1100 has an operation panel 1150, which is provided at a front surface toward the right side wall 1130. The operation panel 1150 includes a plurality of operation buttons 108a to 108e ("the operation button 108"), a power switch 109, an alarm lamp 119, and a plurality of sound output holes 1151. Through the sound output holes 1151, a speaker 115 (FIG. 5) of the terminal 10 is able to output sounds such as sounds generated based on human voice. The body 1100 further includes a holder 1160, which is provided at the front surface toward the left side wall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an outside device connection I/F 118 (FIG. 5). The body 1100 further includes a left side wall 1140, which is provided with a connection port to connect the external display 120 to the display I/F 117 through a cable 120c.

The arm 1200 is fixed to the body 1100 via a torque hinge 1210. With the torque hinge 1210, the arm 1200 can be rotated in directions of up and down with respect to the body, while making a tilt angle θ1 of up to 135 degrees. FIG. 4 illustrates the case where the tilt angle θ1 is 90 degrees.

The camera housing 1300 incorporates therein the camera 112 (FIG. 5) that takes an image of an object. The object may be a part of a user, document, or a room where the terminal 10 is located. The camera housing 1300 is provided with a torque hinge 1310. The camera housing 1300 is fixed to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 4, the pan angle θ2 and the tilt angle θ3 are each 0 degree.

The relay terminal 30, the management system 50, the program providing system 90, and the maintenance system 100 are each implemented by any desired number of general-purpose computers such as one or more personal computers or one or more server computers. For simplicity, explanation of the outer appearance of the computer is omitted.

FIG. 5 is a schematic block diagram illustrating a hardware structure of the communication terminal 10. As illustrated in FIG. 5, the terminal 10 includes a central processing unit (CPU) 101, a read only memory (ROM) 102, a random access memory (RAM) 103, a flash memory 104, a solid state drive (SSD) 105, a medium drive 107, the operation button 108, the power switch 109, a network interface (I/F) 111, the camera 112, an imaging element interface (I/F) 113, the microphone 114, the speaker 115, a sound input/output interface (I/O I/F) 116, the display interface (I/F) 117, the outside device connection interface (I/F) 118, and an alarm lamp 119, which are electrically connected through a bus 110 such as an address bus or data bus. The CPU 101 controls entire operation of the terminal 10. The ROM 102 stores therein a control program for execution by the CPU 101, such as an initial program loader (IPL). The RAM 103 functions as a work area of the CPU 101. The flash memory 104 stores therein various data such as the terminal control program, image data, or voice data. The SSD 105 controls reading or writing of various data with respect to the flash memory 104 under control of the CPU 101. The medium drive 107 controls reading or writing of various data with respect to a removable recording medium 106 such as a flash memory. The operation button 108 allows the user to input a user instruction, for example, by allowing the user to select a communication destination such as the counterpart terminal 10B. The power switch 109 allows the user to switch on or off the power of the terminal 10. The network I/F 111 allows the terminal 10 to transmit data through the communication network 2.

The camera 112 takes an image of an object to obtain image data under control of the CPU 101. The imaging element I/F 113 controls operation of the camera 112. The microphone 114 catches sounds such as voice of the user at the terminal 10. The speaker 115 outputs sounds such as sounds generated based on voice of the user at the counterpart terminal 10B. The sound I/O I/F 116 controls input or output of sound signals such as voice signals with respect to the microphone 114 and the speaker 115 under control of the CPU 101. The display I/F 117 transmits image data to the display 120 under control of the CPU 101. The outside device connection I/F 118 controls connection of the terminal 10 to various types of outside device. The alarm lamp 119 generates notification when an error is detected in the terminal 10.

The display 120 may be implemented by a liquid crystal display (LCD) or an organic light emitting display, which displays various data such as an image of an object or an operation icon. As illustrated in FIGS. 4 and 5, the display 120 is connected to the display I/F 117 through the cable 120c. The cable 120c may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as an external camera, external microphone, or external speaker through a universal serial bus (USB) cable that is connected through the port 1132 of the body 1100 (FIG. 4). When the external camera is connected to the terminal 10, the CPU 101 causes the terminal 10 to capture an image using the external camera, rather than the camera 112 that is incorporated in the terminal 10. When the external microphone or the external speaker is connected to the terminal 10, the CPU 101 causes the terminal 10 to use the external microphone or the external speaker in replace of the incorporated microphone 114 or the incorporated speaker 115. Further, the output device connection I/F 118 may be connected to the input apparatus 40.

The recording medium 106, which can be freely attached to or detached from the terminal 10, includes any desired type of recording medium. In alternative to the flash memory 104, any nonvolatile memory that is readable and writable under control of the CUP 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 6:
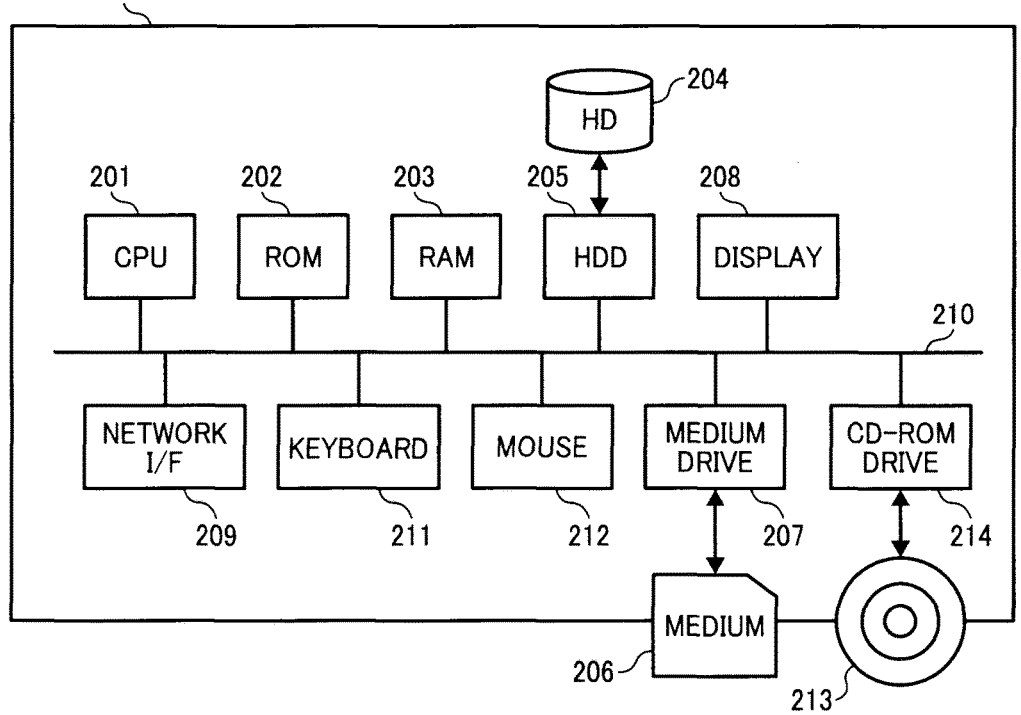
FIG. 6 a schematic block diagram illustrating a hardware structure of any one of the communication management system, external input apparatus, relay terminal, program providing system, and maintenance system of the communication system of FIG. 1.

FIG. 6 illustrates a hardware structure of the management system 50 of FIG. 1. As described above, the management system 50 may be implemented by one or more computers each having the hardware structure of FIG. 6. The management system 50 includes a CPU 201, a ROM 202, a RAM 203, the HD 204, a hard disk drive (HDD) 205, a medium drive 207, a display 208, a network interface (I/F) 209, a keyboard 211, a mouse 212, and a CD-ROM drive 214, which are electrically connected through a bus 210 such as an address bus or a data bus.

The CPU 201 controls entire operation of the management system 50. The ROM 202 stores a control program for execution by the CPU 201, such as an IPL. The RAM 203 functions as a work area of the CPU 201. The HD 204 stores therein various data such as the communication management program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communication network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used.

The communication management program may be written onto a recording medium that is readable by a general-purpose computer such as the recording medium 206 or the CD-ROM 213 in any format that is installable or executable by a general-purpose computer. Once the communication management program is written onto the recording medium, the recording medium may be distributed. Further, the communication management program may be stored in any desired memory other than the HD 204, such as the ROM 202.

The relay terminal 30 is substantially similar in hardware structure to the management system 50 of FIG. 6, except for replacement of the communication management program with a relay terminal control program that is used for controlling the relay terminal 30. The relay terminal control program may be written onto a recording medium that is readable by a general-purpose computer such as the recording medium 206 or the CD-ROM 213 in any format that is installable or executable by the general-purpose computer. Once the relay terminal control program is written onto the recording medium, the recording medium may be distributed. Further, the relay terminal control program may be stored in any desired memory other than the HD 204, such as the ROM 202.

The external input apparatus 40 is substantially similar in hardware structure to the management system 50 of FIG. 6, except for replacement of the communication management program with an input apparatus control program that is used for controlling the external input apparatus. The input apparatus control program may be written onto a recording medium that is readable by a general-purpose computer such as the recording medium 206 or the CD-ROM 213 in any format that is installable or executable by the general-purpose computer. Once the input apparatus control program is written onto the recording medium, the recording medium may be distributed. Further, the input apparatus control program may be stored in any desired memory other than the HD 204, such as the ROM 202.

The program providing system 90 is substantially similar in hardware structure to the management system 50 of FIG. 9, except for replacement of the communication management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

Other examples of removable recording medium, which may be used in replace of the CD-ROM 213, include, but not limited to, compact disc recordable (CD-R), digital versatile disk (DVD), and blue ray disc.

Figure 7:
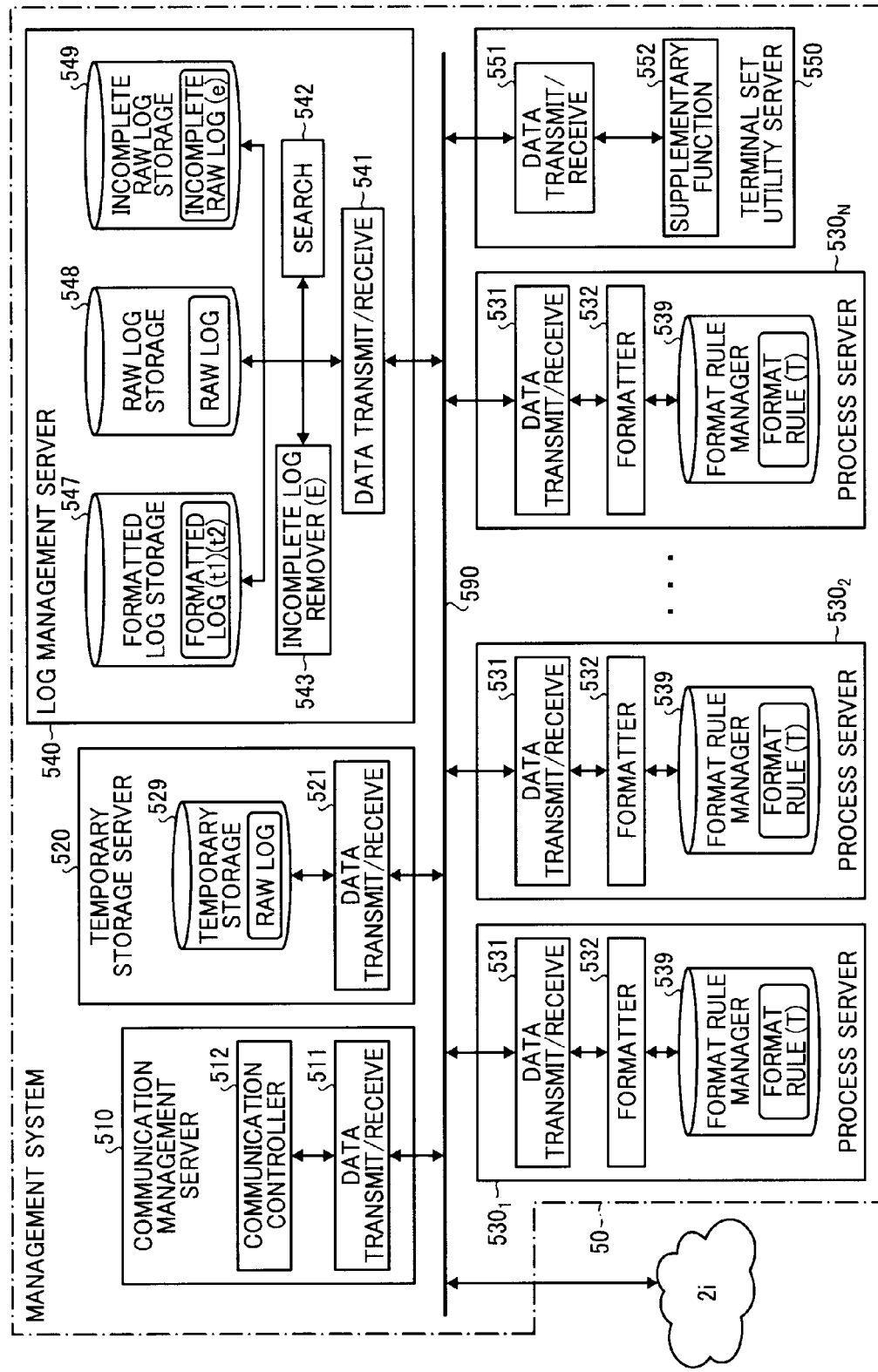
FIG. 7 is a schematic block diagram illustrating a functional structure of the communication management system of FIG. 1.

Next, referring to FIG. 7, a functional structure of a selected portion of the management system 50 is explained according to an example embodiment of the present invention. The portion of the management system 50 of FIG. 7 relates to managing communications log information such as processing raw log data into formatted log data. As illustrated in FIG. 7, the management system 50 includes a communication management server 510, a temporary storage server 520, a plurality of process servers 530-1, 530-2, . . . , and 530-N (N is any positive integer), a log management server 540, and a terminal set utility server 550. These servers of the management system 50 are connected through a LAN 590 such that they are communicable with one another, and further to the Internet 2i through the LAN 590. For the descriptive purposes, one or more of any arbitrary servers of the plurality of process servers 530-1 to 530-N may be referred to as the process server 530.

<Communication Management Server>

The communication management server 510 includes a data transmit/receive 511 and a communication controller 512.

The data transmit/receive 511, which may be implemented by the network I/F 209 under control of the CPU 201 (FIG. 6), transmits or receives various data or information to or from another terminal, device, server, or system, through the communication network 2 that includes the LAN 590 and the Internet 2i. For example, the data transmit/receive 511 receives information relating to communications performed by the terminal 10 through the network 2, from the terminal 10, as raw log data.

The communication controller 512, which may be implemented by instructions sent from the CPU 201 (FIG. 6), controls communications with each terminal 10 through a management data session "sei" (FIG. 2). For example, the communication controller 512 controls or manages communications with the terminal 10 including receiving raw log data from the terminal 10, and transmitting formatted log data or communications log information that is generated based on the formatted log data to the terminal 10 that requests for communications log information.

In this example, raw log data is any data that reflects interactions between the terminal 10 and the management system 50 in performing a conference, such as a videoconference, with one or more terminals 10. For example, the management system 50 receives a message including communication state data indicating the communication state of the terminal 10, from the terminal 10, as raw log data. FIG. 9 illustrates example data fields, or schema, of raw log data received from each terminal 10. In FIG. 9, each raw corresponds to a message, or one record of raw log data, which is received from the terminal 10. The raw log data includes a communication state field, a request terminal ID field, a counterpart terminal ID field, a session ID field, a conference ID field, a conference session ID field, and a communication date/time field.

The "communication state" field corresponds to the communication state data indicating a type of contents, or type of the message, communicated by the terminal 10. The communication state data indicates whether the terminal 10 is online, offline, having a session, etc. such that it reflects the state of a session performed by the terminal 10. As described above referring to FIG. 2, the terminal 10 may have a management data session "sei" or a contents data session "sed".

More specifically, the communication state "online" indicates that the terminal 10 is turned on its power such that the terminal 10 is in the operation state. The communication state "offline" indicates that the terminal 10 is turned off its power such that the terminal 10 is in the offline state. The communication state "invite" indicates that the request terminal 10A requests the counterpart terminal 10B to have a conference. The communication state "call" indicates that the terminal 10 sends a request for participating in a conference session after the conference session starts. The communication state "accept" indicates that the terminal 10 has accepted a request, such as "invite" or "call", from another terminal 10. The communication state "start" indicates that the request terminal 10A starts the conference. The communication state "end" indicates that the request terminal 10A ends the conference. The communication state "join" indicates that the terminal 10 starts participating in the conference session such as by establishing a contents data session with the relay terminal 30 to start relaying contents data. The communication state "leave" indicates that the terminal 10 leaves from the conference session such as by disconnecting the contents data session.

The "request terminal ID" field corresponds to the identification information for identifying the request terminal 10A that sends a request to the management system 50. The "counterpart terminal ID" field corresponds to identification information for identifying the counterpart terminal 10B addressed by the request terminal 10A.

The "session ID" field corresponds to identification information for identifying a session being performed from the time when the terminal 10 is switched to the online state, to the time when the terminal 10 is switched to the offline state. More specifically, the terminal 10 establishes a management data session "sei" with the management system 50 as the terminal 10 logs in the system to have the operation state. The management data session "sei" is disconnected as the terminal 10 logs out from the system to have the offline state.

The "conference ID" field corresponds to identification information for identifying a conference, which is invited by the request terminal 10A. The conference ID is generated when the request terminal 10A requests one or more counterpart terminals 10B to have a conference.

The "conference session ID" field corresponds to identification information for identifying a conference session being performed from the time when the terminal 10 starts participating in the conference session, to the time when the terminal 10 leaves from the conference session. More specifically, the terminal 10 establishes a contents data session "sed" with the relay terminal 30 to cause contents data to be transmitted or received to or from the counterpart terminal 10, when the request for participating in the conference session ("join") is accepted. The contents data session "sed" with the relay terminal 30 is disconnected when the request for leaving from the conference session ("leave") is accepted. While one conference is being performed, any terminal 10 may start participating in a conference session or leave from a conference session at any desired time. Under the same conference assigned with one conference ID, a plurality of conference sessions may be performed with each conference session being assigned with a specific conference session ID. Further, in this example, a conference session is managed for each of the terminals 10 that are participating in the conference such that the conference session performed by each terminal 10 is assigned with a specific conference session ID.

The "communication date/time" field corresponds to the date and time at which a message including the communication state data is received by the management system 50. Alternatively, the communication date/time field may indicate the date and time at which a message including the communication state data is generated or transmitted at the terminal 10.

The raw log data may include any type of fields or communication states in addition or in alternative to the above-described fields or communication states. Further, the raw log data may be received or stored in any desired form, for example, as text data in compliance with JavaScript Object Notation (JSON) or Extensible Markup Language (XML).

Still referring to FIG. 9, some examples of raw log data received from the terminal 10 are explained.

As illustrated in the first raw, when the first terminal 10 having the terminal ID "110001" turns on its power, the raw log data is received from the terminal 10, which includes the communication state data "online", the request terminal ID "110001", the session ID "se001", and the communication date/time "2010-09-01 09:30:00". As illustrated in the second raw and third raw, respectively, the second terminal 10 "110002" and the third terminal 10 "110003" each send the messages to the management system 50 in a substantially similar manner.

As illustrated in the fourth raw, when the first terminal 10 "110001" invites the second terminal 10 having the terminal ID "110002" to have a conference, the raw log data is received from the first terminal 10, which includes the communication state data "invite", the request terminal ID "110001", the counterpart terminal ID "110002", the conference ID "conf001", and the communication date/time "2010-09-01 09:59:50". In this example, as illustrated in the fifth raw, the second terminal 10 "110002" accepts this invitation.

As illustrated in the seventh raw, when the first terminal 10 "110001" starts participating in a conference session for the conference "conf001", the raw log data is received from the first terminal 10, which includes the communication state data "join", the request terminal ID "110001", the conference ID "conf001", the conference session ID "cse01", and the communication date/time "2010-09-01 10:00:00". As illustrated in the eighth raw, the second terminal 10 "110002" participates in a conference session for the conference "conf001" in a substantially similar manner.

As illustrated in the ninth raw, when the third terminal 10 "110003" requests the first terminal 10 "110001" to participate in the conference being performed by the first terminal 10 "110001" and the second terminal 10 "110002", the raw log data is received from the third terminal 10 "110003", which includes the communication state data "call", the request terminal ID "110003", the counterpart terminal ID "110001", the conference ID "conf001", and the communication date/time "2010-09-01 10:09:50". As illustrated in the tenth raw, the first terminal 10 "110001" accepts this call. As the call is accepted, as illustrated in the eleventh raw, the third terminal 10 "110003" participates in a conference session for the conference "conf001".

As illustrated in the thirteenth raw, in case the third terminal 10 "110003" turns off its power in the middle of conference session "cse003" of the conference "conf001", the raw log data is received from the third terminal 10, which includes the request terminal ID "110003", the session ID "se003", the conference ID "conf001", the conference session ID "cse003", and the communication date/time "2010-09-01 11:30:25".

As illustrated in the sixteenth raw, in case the first terminal 10 "110001" turns off its power after leaving from the conference session "conf001" (as illustrated in the fourteenth raw), the raw log data is received from the first terminal 10, which includes the request terminal ID "110001", the session ID "se001", and the communication date/time "2010-09-01 11:35:00".

As described above, in performing a conference session, the terminal 10 sends a sequence of messages each including the communication state data to the management system 50 in an order of the communication state data "invite", "start", "join", "leave", and "end". In performing a conference session by participating in a conference that has been started, the terminal 10 sends a sequence of messages each including the communication state data to the management system 50 in an order of the communication state data "call", "join", and "leave".

<Temporary Storage Server>

Referring back to FIG. 7, the temporary storage server 520 includes a data transmit/receive 521, and a temporary storage 529.

The data transmit/receive 521, which may be implemented by the network I/F 209 under control of the CPU 201 (FIG. 6), transmits or receives various data or information to or from one or more other servers in the management system 50 through the LAN 590.

For example, the data transmit/receive 521 receives raw log data from the data transmit/receive 511 of the communication management server 510 through the LAN 590 for storage in the temporary storage 529, and sends raw log data that is read out from the temporary storage 529 to the process server 530 through the LAN 590. The data transmit/receive 521 further receives raw log data returned from the process server 530 for storage in the temporary storage 529.

The temporary storage 529, which may be implemented by a desired memory (for example, the HD 204, HDD 205, RAM 202) under control of the CPU 201 (FIG. 6), temporarily stores raw log data received from the data transmit/receive 511 of the communication management server 510, or reads out the raw log data from the temporary storage 529 to provide the raw log data to the data transmit/receive 521. The temporary storage 529 may be implemented by a message queue, which provides an asynchronous communications system for the sender and receiver of the messages. The terminal 10 that sends the raw log data does not have to wait for the raw log data to be processed by the management system 50. More specifically, the raw log data received from the terminal 10 through the communication management server 510 is temporarily stored in the temporary storage 529, until it is read out by the process server 530 for further processing. With this configuration, operations such as operations related to communications control may be performed without being influenced by operation of processing raw log data.

<Process Server>

In this example, format processing is performed by the process server 530 that is provided separately from the temporary storage server 520. With this configuration, the management system 50 is able to receive raw log data from the terminal 10 at the temporary storage server 520, even when format processing is not completed by the process server 530. Further, operation of applying format processing to raw log data may be distributed over the plurality of process servers 530 such that a plurality of items of raw log data is concurrently processed while reducing the work loads per one server and increasing the overall processing speeds.

Further, in this example, format processing is any processing that causes the raw log data, which is just a data sequence, to be formatted into information that is useful to the human, or the end user of the communication system 1. More specifically, in this example, format processing is applied so as to cause the raw log data to be formatted into information regarding a conference or a conference session that has been performed or being performed by each of the terminals 10 in a manner that is interpretable to the user of the terminal 10. The information being formatted is referred to as the formatted log data. For example, as described below, the formatted log data is stored in the form of a participant log management table t1 of FIG. 10A, and a conference log management table t2 of FIG. 10B. The participant log management table t1 provides information regarding one or more conference sessions participated or being participated by each terminal 10, which may be referred to as the formatted participant log data. The conference log management table t2 provides information regarding one or more conferences hosted or being hosted by each terminal 10, which may be referred to as the formatted conference log data.

In this specification, processing applied by the process server 530 to the raw log data is referred to as format processing. However, any such processing that makes the raw log data into information useful to the end user may be expressed in any other term. Examples of such term include, but not limited to, editing, modifying, organizing, arranging, setting up, adjusting, and forming. Further, the raw log data that is applied with such format processing is referred to as the formatted log data. The formatted log data may be expressed using any other term such as edited log data, modified log data, organized log data, arranged log data, set log data, adjusted log data, and formed log data.

The process server 530 includes a data transmit/receive 531, a formatter 532, and a format rule manager 539. The data transmit/receive 531, which may be implemented by the network I/F 209 under control of the CPU 201 (FIG. 6), transmits or receives various data or information to or from one or more other servers in the management system 50 through the LAN 590.

The format rule manager 539, which may be implemented by a nonvolatile memory such as the HDD 204 and the HDD 205 (FIG. 6), is stored with a format rule management table T of FIGS. 8A and 8B ("FIG. 8"). The format rule management table T of FIG. 8 stores a plurality of format processing start conditions each indicating a condition under which format processing is applied to the raw log data, and format processing information indicating a type of format processing to be applied to the raw log data when the condition is met. More specifically, the format rule management table of FIG. 8 stores a "format start condition" field, a "formatted data table" field, a "record for format" field, and a "format processing" field.

The "format start condition" field indicates a condition under which the formatter 532 starts applying specific format processing to the raw log data. The format start condition is defined by the communication state data included in the raw log data. Alternatively, any desired information obtainable from the raw log data may be used to indicate a specific format start condition. For example, in addition to the communication state data, the conference ID field and the conference session ID field may be used to indicate a specific format start condition, as illustrated in the format start condition for the communication state "offline".

The "formatted data table" field specifies a formatted log data table in which the formatted log data is stored. In this example, the management system 50 generates two types of formatted log data tables using the raw log data: the participant log management table t1 of FIG. 10A; and the conference log management table t2 of FIG. 10B. The "formatted data table" field specifies one of these tables t1 and t2 to indicate which of the tables t1 and t2 should be updated with the formatted log data, which is generated based on the raw log data.

The "record for format" field specifies a record in the formatted log data table that is specified by the "formatted data table" field, which should be updated with the formatted log data.

The "format processing" field indicates a type of format processing to be applied to the raw log data to generate the formatted log data. More specifically, the "format processing" field indicates association between a specific field of the raw log data and a specific field of the formatted log data. In FIG. 8, the data fields that are not underlined each correspond to a specific data field in the formatted log data, and the data fields that are underlined (shown at the right sides) each correspond to a specific data filed in the raw log data.

The formatter 532, which may be implemented by instructions of the CPU 201 (FIG. 6), applies specific format processing to raw log data to generate formatted log data, according to a specific format rule that is defined by the format rule management table T.

For example, the formatter 532 determines whether the raw log data is stored in the temporary storage 529, for example, by causing the data transmit/receive 531 to send a request through the LAN 590 to the data transmit/receive 521 of the temporary storage server 520. When it is determined that the raw log data is stored, the formatter 532 searches the format rule management table T (FIG. 8) using the communication state data extracted from the raw log data as a search key to determine whether any one of the start format conditions matches the extracted communication state data. When the start format condition that matches the extracted communication state data is not specified, the formatter 532 does not perform any format processing. When the start format condition that matches the extracted communication state data is specified, the formatter 532 extracts information regarding the specific format processing to be applied, which is stored in association with the specified start format condition. The formatter 532 performs format processing to the raw log data to generate the formatted log data using the extracted information regarding the specific format processing to be applied.

More specifically, the formatter 532 specifies one of the participant log management table t1 and the conference log management table t2 using the "formatted data table" field, and specifies a record in the selected formatted log data table using the "record for format" field. When the record specified by the "record for format" field does not exist in the selected formatted log table, the formatter 532 generates a new record in the selected formatted log table.

The formatter 532 further updates one or more data fields in the selected record of the selected formatted log table, with the values of associated fields in the associated record of the raw log data, as specified by information stored in the "format processing" field of the format rule management table T. When the field in the selected formatted log table to be updated already has a value, the formatter 532 does not update the stored value.

Further, in case the raw log data including the communication state data "start" or "end" is obtained for format processing, the formatter 532 updates a "meeting time" field in the conference log management table t2. More specifically, the value of meeting time is calculated by subtracting the communication date/time of the raw log data with the "start" from the end date/time of the formatted data table, or subtracting the start date/time of the formatted data table from the communication date/time of the raw log data with the "end". When the start date/time or the end date/time is not obtainable from the conference log management table t2, the meeting time is not calculated. In such case, the formatter 532 does not input any value in the "meeting time" field.

Similarly, in case the raw log data including the communication state data "join", "leave", or "offline" (for "offline" with the "null" conference ID and the "null" conference session ID) is obtained for format processing, the formatter 532 updates a "participation time" field in the participant log management table t1. More specifically, the value of participation time is calculated by subtracting the communication date/time of the raw log data with the join from the leave date/time of the table t1, subtracting the participated date/time of the table t1 from the communication date/time of the raw log data with the leave, or subtracting the participated date/time of the table t1 from the communication date/time of the raw log data with the offline. When the participated date/time or the leave date/time in the participant log management table t1 is not obtainable, the participation time is not calculated. In such case, the formatter 532 does not input any value in the "participation time" field.

Alternatively, any desired format rule other than the above-described format rule may be used to format the raw log data into the formatted log data. Further, in alternative to managing the format rule using the format rule management table T, the format rule may be managed in various other ways, according to a set of computer programmable instructions.

Further, as described above, format processing may be distributed over the plurality of process servers 530 such that each process server 530 may perform a different format processing according to a different format rule managed by the format rule manager 539. For example, referring to FIG. 8, the format rule related to the conference log management table t2 may be managed by the format rule manager 539 of the first process server 530-1. The format rule related to the participant log management table t1 may be managed by the format rule manager 539 of the second process server 530-2. As different types of format processing may be concurrently performed using the plurality of process servers 530, the overall processing speeds in formatting the raw log data into the formatted log data increase.

The formatter 532 causes the data transmit/receive 531 to send the formatted log data, which is generated by the formatter 532, to the log management server 540 through the LAN 590 to store the formatted log data in the formatted log storage 547. The formatter 532 further causes the data transmit/receive 531 to transmit the raw log data through the LAN 590 to the log management server 540 to store the raw log data in the raw log storage 548. When the formatter 532 determines that generating or storing of the formatted log data or storing of the raw log data fails, the formatter 532 causes the data transmit/receive 531 to transmit the raw log data, which is raw log data before a specific format processing is applied, to the temporary storage server 520 through the LAN 590. The data transmit/receive 521 stores the returned raw log data in the temporary storage 529.

Further, in the process of performing format processing, the formatter 532 determines whether information included in the raw log data is complete, that is, whether the raw log data has all data fields that are supposed to be included to perform format processing. When the raw log data is incomplete such that not all data fields that are supposed to be included are not present, the formatter 532 does not perform format processing to such incomplete raw log data (e). In such case, the formatter 532 causes the data transmit/receive 531 to transmit the incomplete raw log data (e) to the log management server 540 through the LAN 590 to store the incomplete raw log data (e) in the incomplete log storage 549.

<Log Management Server>

The log management server 540 includes a data transmit/receive 541, a search 542, an incomplete log remover 543, the formatted log storage 547, the raw log storage 548, and the incomplete raw log storage 549.

The data transmit/receive 541, which may be implemented by the network I/F 209 under control of the CPU 201 (FIG. 6), transmits or receives various data or information to or from one or more other servers in the management system 50 through the LAN 590.

The search 542 searches the formatted log data stored in the formatted log storage 547 to extract formatted log data that matches a request of the request terminal 10, when a request for obtaining communications log information is received from the request terminal 10.

The incomplete log remover 543 may be implemented by the instructions of the CPU 201 (FIG. 6). When a request for obtaining communications log information is received from the request terminal 10, for example, through the external input apparatus 40 connected to the request terminal 10, the incomplete log remover 543 determines whether each set of the formatted log data extracted from the formatted log storage 547 includes a plurality of data fields that are supposed to be included. When the incomplete log remover 543 specifies formatted log data from which one or more data fields are missing, the incomplete log remover 543 determines that the specified formatted log data as incomplete formatted log data (E) and removes the incomplete formatted log data (E) from the extracted formatted log data.

If the raw log data is stored in the temporary storage 529 in an order that is received from each of the terminals 10, there should be no incomplete formatted log data (E). In case the temporary storage 529 operates asynchronously at least in part, the raw log data is not always stored in an order that each terminal 10 sends the raw log data. Further, when format processing is being performed by the plurality of process servers 530, format processing may not be performed on the raw log data in an order that the raw log data is stored in the temporary storage 529 or read out from the temporary storage 529. Depending on the time at which a request for obtaining communications log information is received, the formatted log data may include incomplete formatted log data from which one or more data fields that are supposed to be included are missing. The incomplete log remover 543 removes the incomplete formatted log data (E) from the extracted formatted log data that matches the request, before outputting the extracted formatted log data in response to the request for obtaining communications log information.

The formatted log storage 547 stores the formatted log data that is generated by the process server 530. In this example, the formatted log data is managed using the participant log management table t1 of FIG. 10A and the conference log management table t2 of FIG. 10B.

The participant log management table t1 stores information regarding one or more conference sessions participated or being participated by each of the terminals 10. As illustrated in FIG. 10A, the participant log management table t1 includes a "log ID" field, a "terminal ID" field, a "conference ID" field, a "conference session ID" field, a "participated date/time" field, a "leave date/time" field, a "participation time" field, and a "leave state" field.

The "log ID" field corresponds to identification information for identifying a specific log relating to a participant who participated or is participating in the conference session. In this example, the participant is managed in terms of terminal ID based on assumption that the user communicates through the terminal 10. The "terminal ID" field corresponds to identification for identifying a terminal 10 that participated or is participating in the conference. The "conference ID" field corresponds to identification for identifying a conference of the conference session that is participated or being participated by the terminal 10.

The "conference session ID" field corresponds to identification information for identifying the conference session that is participated or being participated by the terminal 10. As described above, the conference session is established from the time when the communication state data "join" is received, to the time when the communication state data "leave" is received, for each terminal 10 having a conference. Since the conference session is managed for each of the terminals 10, a conference session ID differs among the terminals 10 even the terminals 10 are having the conference with the same conference ID. Further, if the terminal 10 repeats joining and leaving a plurality of times for the same conference with the same conference ID, a plurality of number of conference sessions each having a different session ID are recorded.

The "participated date/time" field indicates the time at which the terminal 10 participates in the conference session. The "leave date/time" field indicates that the time at which the terminal 10 leaves from the conference session. The "participation time" field indicates a time period during which the terminal 10 has participated in the conference session.

The "leave state" field corresponds to the leave state, which indicates how the terminal 10 leaves from the conference session. In this example, examples of leave state include the "LEAVE" indicating that the terminal 10 leaves from the conference session without an error, the "FORCED QUIT" indicating that the terminal 10 is forced to quit the conference session due to an error such as the failure in power supply, and the "MEETING" indicating that the terminal 10 is still participating in the conference session.

In alternative to or in addition to the above-described data fields, the participant log management table t1 may include any desired data fields or values.

The conference log management table t2 stores information regarding one or more conferences hosted or being hosted by each of the terminals 10. As illustrated in FIG. 10B, the conference log management table t2 includes a "conference ID" field, a "host terminal ID" field, a "start date/time" field, an "end date/time" field, and a "meeting time" field.

The "conference ID" field indicates identification information for identifying a conference that is hosted or being hosted by the terminal 10. The "host terminal ID" field indicates identification information for identifying the terminal 10 that is hosting the conference. For example, assuming that the conference is to be performed among three terminals 10, one of the terminals 10 is registered as a host of the conference. The host terminal 10 is the terminal 10, which sends the request for starting the conference with the communication state data "start", and the request for ending the conference with the communication state data "end". The host terminal 10 sends the request for inviting one or more other terminals 10 with the communication state data "invite".

The "start date/time" field indicates the time at which the conference is started by the host terminal 10. The "end date/time" field indicates that the time at which the conference ends by the host terminal 10. The "meeting time" filed indicates a time period during which the conference is performed.

In alternative to or in addition to the above-described data fields, the conference log management table t2 may include any desired data fields or values.

In the above-described example, the format log storage 547 stores the participant log management table t1 and the conference log management table t2. Alternatively, the participant log management table t1 and the conference log management table t2 may be each stored in different databases. Further, various other types of formatted log data may be generated based on the raw log data, depending on a specific format rule that is previously determined.

Referring back to FIG. 7, the raw log storage 548 stores the raw log data, which is stored in the temporary storage 529, as mater data for a longer time period. The master data may be used by any user in the system in analyzing the raw log data when an error is detected.

The incomplete raw log storage 549 stores the incomplete raw log data (e), which is selected from the raw log data. The formatter 532 determines whether all data fields that are supposed to be included in the raw log data are included, and determines that the raw log data is incomplete when one or more data fields that are supposed to be included are missing. The incomplete raw log data (e) may be used by any user in the system in analyzing an error that causes the raw log data to be incomplete.

<Terminal Set Utility Server>

The terminal set utility server 550 receives a request for obtaining communications log information from the request terminal 10, and provides the formatted log data that matches the request or communications log information that is generated based on the formatted log data to the terminal 10. The terminal set utility server 550 includes a data transmit/receive 551 and a supplementary function 552.

The data transmit/receive 551, which may be implemented by the network I/F 209 under control of the CPU 201 (FIG. 6), interacts with the terminal 10 in processing a request for obtaining communications log information. More specifically, the data transmit/receive 541 receives a request for obtaining communications log information from the terminal 10. In response to the request, the data transmit/receive 541 provides the formatted log data that matches the request or communications log information that is generated based on the formatted log data to the terminal 10. The management system 50 may receive the request for obtaining communications log information from the terminal 10 through the data transmit/receive 511 or the data transmit/receive 551. The management system 50 may provide the formatted log data that matches the user request, or communications log information based on the formatted log data that matches the request, through the data transmit/receive 551 or the data transmit/receive 511.

The supplementary function 552 provides various other functions that may be provided by the management system 50, in addition to the above-described operation of processing the raw log data and controlling communications among the servers of the management system 50.

<Operation of Formatting Raw Log Data>

Figure 11A:
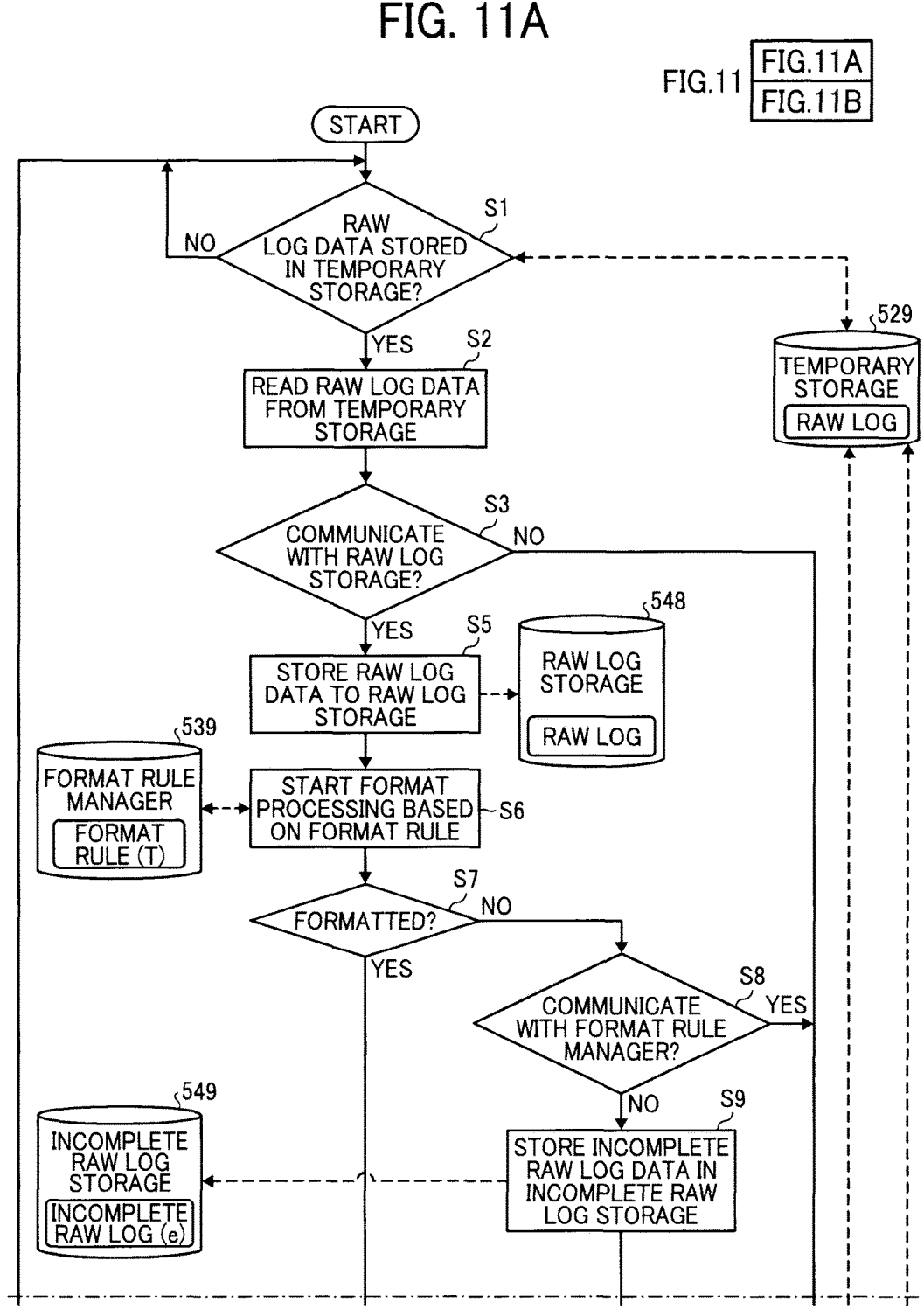
FIGS. 11A and 11B are a flowchart illustrating operation of applying format processing to raw log data to generate formatted log data, performed by the management system of FIG. 7, according to an example embodiment of the present invention.
Figure 11B:
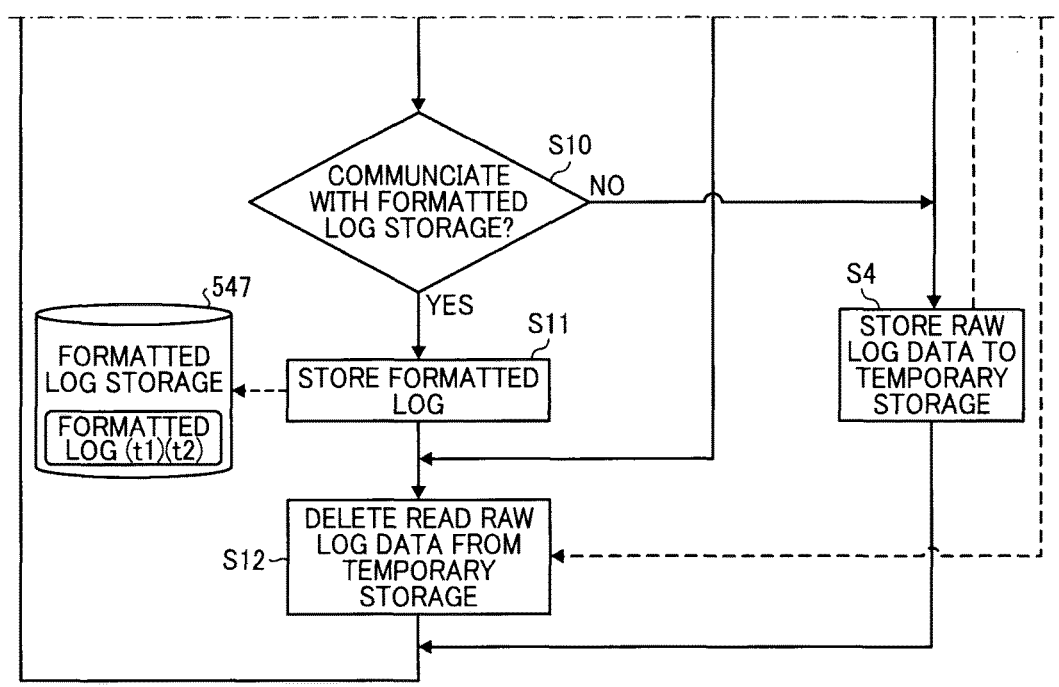

Referring now to FIGS. 1, 7, and 11, operation of formatting raw log data into formatted log data, performed by the communication system 1, is explained according to an example embodiment of the present invention. FIGS. 11A and 11B ("FIG. 11") are a flowchart illustrating operation of formatting raw log data into formatted log data, performed by the management system 50, according to an example embodiment of the present invention.

In FIG. 1, when the change in communication state of the terminal 10 is detected, the terminal 10 sends a message including the communication state data of the terminal 10 to the management system 50, as raw log data relating to communications performed by the terminal 10. In FIG. 7, the communication management server 510 of the management system 50 receives the message including the communication state data of the terminal 10 from the terminal 10 as the raw log data, and transmits the raw log data to the temporary storage server 520. The data transmit/receive 521 of the temporary storage server 520 receives the raw log data from the communication management server 510. The temporary storage 529 stores the raw log data that is received at the data transmit/receive 521. By repeating this operation every time the message is received from each terminal 10, the temporary storage 529 is accumulated with the raw log data regarding the communications performed by each terminal 10. Alternatively, the temporary server 520 may receive the raw log data directly from each terminal 10.

Referring now to FIG. 11, operation of formatting the raw log data into formatted log data, performed by the management system 50, is explained according to an example embodiment of the present invention.

At S1, the formatter 532 of the process server 530 determines whether the temporary storage 520 stores any raw log data, for example, by sending a request to the temporary storage 529 through the LAN 590. When it is determined that the raw log data is not stored ("NO" at S1), the operation repeats S1. When it is determined that the raw log data is stored ("YES" at S1), the operation proceeds to S2.

At S2, the formatter 532 reads out the raw log data from the temporary storage 520 through the LAN 590.

At S3, the formatter 532 determines whether the raw log storage 548 of the log management server 540 is in the state that can be communicated.

When it is determined that the raw log storage 548 is not available for communication ("NO" at S3), the operation proceeds to S4. At S4, the formatter 532 returns the raw log data that is read out at S2 to the temporary storage 529 through the LAN 590. When it is determined that the raw log storage 548 is available for communication ("YES" at S3), the operation proceeds to S5. At S5, the formatter 532 stores the raw log data in the raw log storage 548 of the log management server 540 as master data. In this manner, the raw log data is kept stored as master data for possible later use.

At S6, the formatter 532 determines whether to apply format processing to the raw log data read out at S2 to generate formatted log data, and if it is determined that format processing is to be applied, formats the raw log data into the formatted log data according to a format rule previously determined.

For example, the formatter 532 determines whether the raw log data read out at S2 meets the format start condition as defined by the format rule management table T (FIG. 8). More specifically, as described above referring to FIG. 8, when the communication state data included in the raw log data matches any one of the communication state data defined by the "format start condition" field of the format rule management table T, the formatter 532 determines that the raw log data read out from the temporary storage 520 is subjected for format processing. In case the communication state data "offline" is included in the raw log data, the formatter 532 further determines whether the conference ID and the conference session ID each have the "null" value. Further, in this example, when the raw log data includes the communication state data "online" or "accept", the formatter 532 determines not to apply format processing to such raw log data.

Assuming that the formatter 532 determines that the raw log data satisfies the format start condition, the formatter 532 searches the format rule management table T (FIG. 8) using one or more data fields extracted from the raw log data as a search key to obtain information regarding the format processing to be applied that is stored in association with the format start condition.

More specifically, the formatter 532 refers to the "formatted data table" field and the "record for format" field to extract a record in a specific formatted log data table, which is subjected for format processing. For example, when the communication state data "invite" is included in the raw log data, the formatter 532 selects the conference log management table t2, and extracts a record with the conference ID that is the same as the conference ID of the raw log data. In another example, when the communication state data "join" is included in the raw log data, the formatter 532 selects the participant log management table t1, and extracts a record with the conference session ID that is the same as the conference session ID of the raw log data. When a record specified by the "record for format" field does not exist, the formatter 532 creates a new record with the conference ID of the raw log data or the conference session ID of the raw log data.

The formatter 532 further refers to the "format processing" field that is associated with the format start condition that is satisfied by the raw log data to apply specific format processing to the raw log data to generate the formatted log data. As described above referring to FIG. 8, the "format processing" field of the format rule management table T indicates how one or more data fields in the selected one of the conference log management table t1 and the participant log management table t2 are entered or updated with the values of data fields extracted from the raw log data.

For example, in case the raw log data including the communication state data "invite" is to be formatted, the formatter 532 modifies the specified record in the conference log management table t2 by entering the conference ID of the raw log data in the "conference ID" field, and the request terminal ID of the raw log data in the "host terminal ID" field.

In another example, in case the raw log data including the communication state data "join" is to be formatted, the formatter 532 modifies the specified record in the participant log management table t1 by entering the request terminal ID of the raw log data in the "terminal ID" field, the conference ID of the raw log data in the "conference ID" field, the conference session ID of the raw log data in the "conference session ID" field, and the communication date/time of the raw log data in the "participated date/time" field. For the "participated time" field in the participant log management table t1, the formatter 532 does not enter any value as the leave date/time is not available. The formatter 532 enters "MEETING" in the "leave state" field.

At S7, the formatter 532 determines whether format processing is successfully applied to the raw log data read out at S2 according to the format rule specified by the format rule management table T. When it is determined that format processing is not successful ("NO" at S7), the operation proceeds to S8 to determine whether an error is due to an error in communications with the format rule manager 539.

When it is determined that the error is due to the communications error with the format rule manager 539 ("YES" at S8), the operation proceeds to S4. At S4, the formatter 532 returns the raw log data obtained at S2 to the temporary storage 529 through the LAN 590. When it is determined that the error is not due to the communications error with the format rule manager 539 ("NO" at S8), the operation proceeds to S9.

At S9, the formatter 532 determines that the raw log data obtained at S2 is incomplete raw log data (e), and stores the incomplete raw log data (e) in the incomplete log storage 549 of the log management server 540 through the LAN 590. The user of the communication system 1 may analyze the incomplete raw log data (e) to fix the problem.

As described above referring to S4, the formatter 532 returns the raw log data, which is not formatted, to the temporary storage 529 when it is determined that the error is due to the communications error with the format rule manager 539. The communications error with the format rule manager 539 may include an error due to database, which can be fixed relatively easily. When such error is fixed, the unprocessed raw log data is subjected for format processing as long as the raw log data is returned to the temporary storage 529. As the unprocessed raw log data is returned to the temporary storage 529 even in case the communication error occurs, all raw log data subjected for format processing will be formatted.

As described above referring to S9, the formatter 532 stores the incomplete raw log data (e), which is determined to be incomplete, in the incomplete raw log storage 549 in case when one or more data fields that are needed for format processing are missing from the raw log data. If such error repeatedly occurs after accessing the format rule manager 539, the raw log data is determined to be the incomplete raw log data (e) and stored into the incomplete raw log storage 549.

In alternative to or in addition to returning the unprocessed raw log data to the temporary storage 529 in case the communications error occurs, or storing the incomplete raw log data in the incomplete raw log storage 549 in case the raw log data is incomplete, the formatter 532 may cause the data transmit/receive 531 to transmit an email to an administrator of the communication system 1 to notify that an error in format processing occurs or incomplete raw log data is detected. With this notice, the administrator is able to immediately know that the communications error occurs or incomplete raw log data is detected.

Referring back to S7, when it is determined that the formatted log data is successfully generated ("YES" at S7), the operation proceeds to S10. At S10, the formatter 532 determines whether the formatted log storage 547 is available for communication. When it is determined that the formatted log storage 547 is not available for communication ("NO" at S10), operation proceeds to S4. At S4, the formatter 532 returns the raw log data in the temporary storage 529 through the LAN 590.

When it is determined that the formatted log storage 547 is available for communication ("YES" at S10), the operation proceeds to S11. At S11, the formatter 532 stores the formatted log data obtained at S6 in the formatted log storage 547 of the log management server 540 through the LAN 590.

After S9 and S11, at S12, the formatter 532 causes the temporary storage 529 of the temporary storage server 520 to delete the raw log data, which is read output at S2, through the LAN 590.

After S12 or S4, the operation returns to S1 to cause the formatter 532 to obtain raw log data, which has not been processed, from the temporary storage 529 to repeat the above-described operation.

As described above referring to FIG. 11, the formatter 532 of the process server 530 processes the raw log data in realtime as the raw log data is detected in the temporary storage 529 to generate the formatted log data without waiting for a request for obtaining communications log information. If the raw log data is incomplete or any communications error is detected, the process server 530 causes unprocessed raw log data to be returned to the temporary storage 529 for later use, causes another storage to store such data, or generates notification. With this configuration, the formatter 532 is able to process the raw log data as the raw log data is received and stored in the temporary storage 529.

The above-described operation of FIG. 7 may be performed in various other ways. For example, at S9, when the incomplete raw log data (e) is not stored in the incomplete log storage 549, for example, as the incomplete log storage 549 is not available for communication, the formatter 532 may return the raw log data that is determined to be incomplete to the temporary storage 529.

Figure 12:
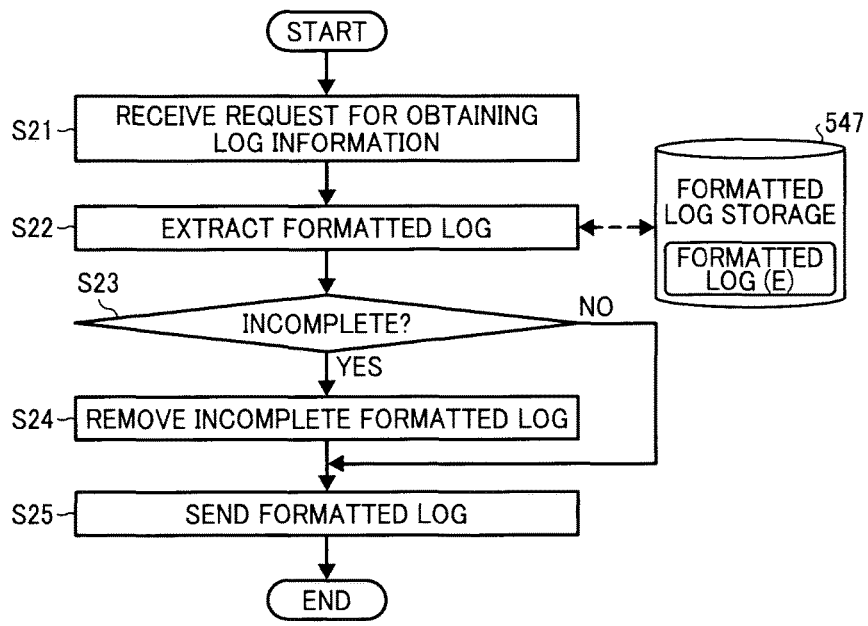
FIG. 12 is a flowchart illustrating operation of processing a request for obtaining communications log information for a specific time range, performed by the management system of FIG. 7, according to an example embodiment of the present invention.

Referring now to FIGS. 7, 12, 13A, 13B, and 14, operation of providing communications log information based on the formatted log data to the terminal 10, performed by the management system 50 in response to a request from the terminal 10, is explained according to an example embodiment of the present invention. More specifically, operation of FIG. 12 is performed by the management system 50 when a request for obtaining communications log information is received from the request terminal 10.

Figure 13A:
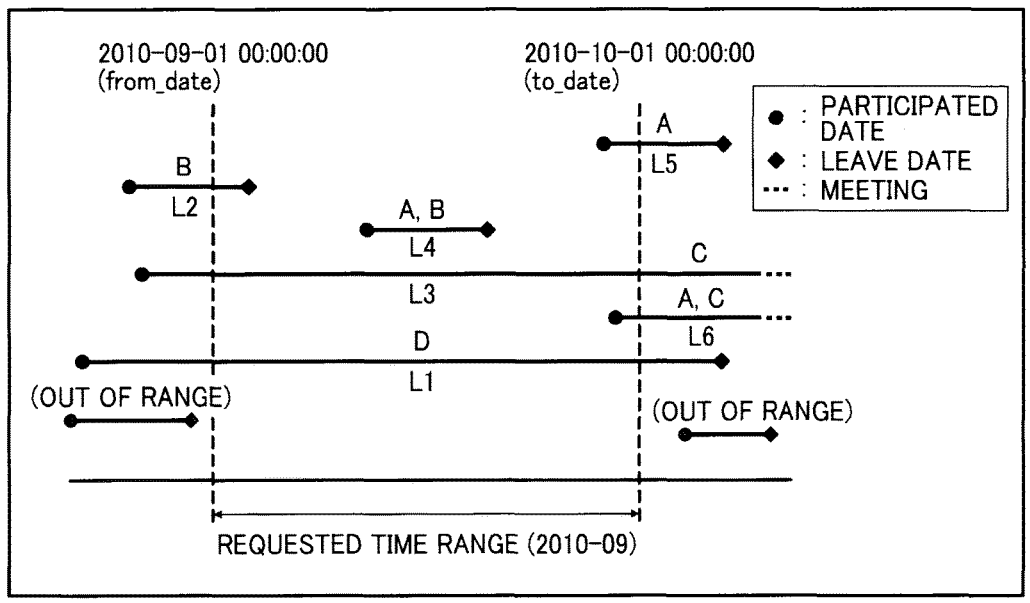
FIG. 13A is an illustration for explaining a range of time from which the formatted log data is obtained to generate the communications log information for the specific time range.

In this example, FIG. 13A illustrates a range of time from which the formatted log data is extracted that matches the request. FIG. 13B illustrates a search condition for searching the formatted log data that matches the request when the request for obtaining communications log information is received. FIG. 14 illustrates a screen to be displayed by the external input apparatus 40 of the terminal 10 in response to the request for obtaining the communications log information.

Referring to FIG. 12, at S21, the data transmit/receive 551 of the terminal set utility server 550 (FIG. 7) receives a request for obtaining communications log information regarding the communications log of the request terminal 10A, from the request terminal 10A through the communication network 2. When the request for obtaining communications log information is received, the data transmit/receive 551 of the terminal utility server 550 sends notification to the log management server 540. The request for communications log information includes the terminal ID of the request terminal 10A that sends the request, and information regarding a time range of interest that may be expressed in terms of a date, week, month, or year. The information included in the request for communications log information is used as a search parameter of the formatted log data. For example, the time range of interest, or the requested time range, may be inputted by the user using an input device such as the keyboard 211 or the mouse 212 of the external input apparatus 40 connected to the request terminal 10A. In this example, it is assumed that the requested time range is expressed in terms of month and year such as September, 2010 ("2010-9").

At S22, the search 542 of the log management server 540 searches the formatted log storage 547 using the search parameter to extract formatted log data that matches the request. More specifically, the search 542 specifies a range of the formatted log data that falls in the requested time range extracted from the request for communications log information, using the starting date ("from_date") to the end date ("to_date"). For example, assuming that the user requests to obtain the communications log information for 2010-09, the formatted log data to be extracted is any formatted log data having the date/time information that ranges from Sep. 1, 2010, 0 AM ("from_date"=2010-09-01 00:00:00) to Sep. 30, 2010, 0 AM ("to_date"=2010-10-01 00:00:00). According to the search conditions A, B, C, and D of FIG. 13B, the search 542 searches the participant log management table t1 using the terminal ID of the request terminal 10A and the requested time range ("from_date", "to_date"), to extract formatted participant log data i1 that matches the request. The search 542 further searches the conference log management table t2 using the conference ID included in the extracted formatted participant log data i1 as a search key to extract formatted conference log data i2 that matches the conference ID included in the extracted formatted participant log data i1. The search 542 merges the extracted formatted participant log data i1 and the extracted formatted conference log data i2 into extracted formatted log data I that matches the request. When there is more than one set of extracted formatted log data I for the request terminal 10A, the search 542 further merges a plurality of extracted formatted log data sets I to one group of formatted log data IG. The extracted formatted log data I or the extracted formatted log data group IG is provided to the request terminal 10 as a search result. Based on the search result, the request terminal 10 may cause the external input apparatus 40 to display communications log information that is generated based on the extracted formatted log data I or the extracted formatted log data group IG.

Referring now to FIG. 13B, operation of searching the formatted log data using the search condition is explained according to an example embodiment of the present invention. With the formatted log data, the management system 50 easily extracts the formatted log data that matches the user request, even when the participated date/time and the leave data/time of a conference session does not fall within the same month.

For example, it is assumed that the user at the request terminal 10 sends a request for obtaining communications log information for the month of September. If the formatted conference log data obtainable from the participant log management table t1 indicates that the request terminal 10 participates in a conference session on Aug. 30, 2010 ("2010-08-30") and leaves from the conference session on Oct. 1, 2010 ("2010-10-01"), the management system 50 extracts the formatted log data relating to this conference session, as the search result for each of the months of August, September, and October. The management system 50 obtains a range of time period from the time at which the request terminal 10 participates ("participated date/time") to the time at which the request terminal 10 leaves ("leave date/time"), from the formatted log data. As long as the range of the obtained time period ("2010-08-30" to "2010-10-01") is overlapped with the requested time range ("2010-09-01" to "2010-10-01") at least partially, the formatted log data is extracted.

In FIG. 13A, the formatted log data having the ranges L1 to L6 will be extracted, as the ranges L1 to L6 overlapped with the requested time range ("2010-09") at least partially. More specifically, the search 542 searches the formatted log data in the formatted log storage 547 using the search conditions A, B, C, and D as illustrated in FIG. 13B to extract the formatted log data having the range of time period that is overlapped with the requested time range at least partially.

The search condition A is used to extract a case in which the participated date/time is within the requested time range. More specifically, the search condition A causes the search 542 to extract the formatted log data having the terminal ID of the request terminal 10, with the participated date/time that is equal to or greater than the "from_date" of the requested time range and less than the "to_date" of the requested time range. Through searching the formatted log data with this search condition A, the formatted log data having the participated date/time that falls out of the requested time range is eliminated. In the example case illustrated in FIG. 13A, the formatted log data with the ranges L5, L4, and L6 are extracted.

The search condition B is used to extract a case in which the leave date/time is within the requested time range. More specifically, the search condition B causes the search 542 to extract the formatted log data having the terminal ID of the request terminal 10, with the leave date/time that is equal to or greater than the "from_date" of the requested time range and less than the "to_date" of the requested time range. Through searching with this search condition B, the formatted log data having the leave date/time that falls out of the requested time range is eliminated. In the example case illustrated in FIG. 13A, the formatted log data with the ranges L2 and L4 are extracted.

The search condition C is used to extract a case in which the participated date/time falls within the requested time range, but still participating in the conference session. More specifically, the search condition C causes the search 542 to extract the formatted log data having the terminal ID of the request terminal 10, with the leave state "meeting" and the participated date/time that is less than the "to_date" of the requested time range. Through searching with this search condition C, the formatted log data that corresponds to the conference session that is still being carried out is extracted. In the example case illustrated in FIG. 13A, the formatted log data with the ranges L3 and L6 are extracted. Since one terminal 10 can participate in one conference session at a time, it is assumed that only one set of the formatted log data that satisfies the search condition C is extracted per one terminal 10.

The search condition D is used to extract a case in which a range of time period from the participated date/time to the leave date/time extends over different months. More specifically, the search condition D causes the search 542 to extract the formatted log data having the terminal ID of the request terminal 10, with the participated time that is equal to or greater than the requested time range, the participated date/time that is less than the "from_date" of the requested time range, and the leave date/time that is equal to or greater than the "to_date" of the requested time range. In this example, since the requested time range is one month, the search condition D causes the search 542 to extract the formatted log data having a participated time with more than one month. Through searching with this search condition D, the formatted log data having the participated time that is equal to or greater than the requested time range is extracted, even when such formatted log data is not extracted with the conditions A, B, and C as the formatted log data has the participated date/time and the leave date/time each falling out of the requested time range. In the example case illustrated in FIG. 13B, the formatted log data with the range L1 is extracted.

The search results obtained using the search conditions A, B, C, and D are integrated into one search result by "OR". As described above, by searching using a plurality of search conditions each limiting a range of search, the overall processing time required for searching is greatly reduced.

In this example, it is assumed that the requested time range is expressed in terms of month and year, such as September, 2010 ("2010-9"). Alternatively, the requested time range may be expressed in various other ways including, for example, in terms of date, month, and year ("2010-09-01"), year ("2010"), or a specific range of time ("2010-09-01 00:00:00" to "2010-09-20 12:00:00"). Further, the above-described example illustrated in FIG. 13B assumes that the formatted log data is searched using the terminal ID of one request terminal 10. Alternatively, the formatted log data may be searched using each one of terminal IDs of a plurality of request terminals 10. In alternative to or in addition to searching using the terminal ID of the request terminal 10 and the requested time range, any other search parameters may be used.

Referring back to FIG. 12, further operation of providing the extracted formatted log data I or the extracted formatted log data group IG to the request terminal 10A performed after S23 is explained. In this example, it is assumed that the formatted log data group IG is obtained.

At S23, the incomplete log remover 543 determines whether the extracted formatted log data group IG includes any formatted log data I that is determined to be the incomplete formatted log data E. When it is determined that the incomplete formatted log data E is not included ("NO" at S23), the operation proceeds to S25. When it is determined that the incomplete formatted log data E is included ("YES"), the operation proceeds to S24 to remove the incomplete formatted log data E from the extracted formatted log data group IG. This prevents the management system 50 from providing the incomplete formatted log data E to the request terminal 10A.

As described above referring to FIG. 9, the terminal 10 sends a message including the communication state data to the management system 50 in an order determined by the communication state data included in the message. More specifically, in case the terminal 10 starts a conference session, the messages are sent in the order of the communication state data "invite", "start", "join", "leave", and "end". Accordingly, the data fields of the formatted log data are generated or updated so as to reflect this order in which the management system 50 should receive the communication state data from the terminal 10. More specifically, the data fields of the formatted log data are generated in the order of "host terminal ID" of the conference log management table t2, "start date/time" of the conference log management table t2, "participated date/time" of the participant log management table t1, "leave date/time" of the participant log management table t1, and "end date/time" of the conference log management table t2, for a specific conference session. The incomplete log remover 543 refers to these data fields of the formatted log data I in an order that is reverse of this order in which the data fields should be generated.

When the incomplete log remover 543 determines that one or more data fields are missing, the incomplete log remover 543 determines that the formatted log data I is incomplete. The above-described rule in checking for incomplete formatted log data I, such as the order of referring to the data fields of the incomplete formatted log data, may be managed in the form of electronic file. Such electronic file may be managed outside the incomplete log remover 543.

At S25, the data transmit/receive 541 of the log management server 540 sends the extracted formatted log data group IG to the terminal set utility server 550. The data transmit/receive 551 sends the extracted formatted log data group IG to the request terminal 10A.

The request terminal 10A, which receives the extracted formatted log data group IG, causes the external input apparatus 40 to display a screen on the display 208 of the external input apparatus 40. More specifically, as illustrated in FIG. 14, the external input apparatus 40 displays a communication terminal set utility screen 1000 using a browser that is previously installed on the input apparatus 40. The screen 1000 includes a terminal ID part 1001 indicating the terminal ID "110001" of the request terminal 10A, a time range part 1002 indicating a requested time range ("September, 2010") requested by the user as a time range of interest, a pull-down menu 1003 that allows the user to select the requested time range, and a log information part 1004 displaying communications log information that is generated based on the extracted formatted log data group IG that is obtained from the management system 50.

More specifically, in the example illustrated in FIG. 14, the external input apparatus 40 logs in the terminal set utility server 550 with the terminal ID "110001" of the request terminal 10A, through the request terminal 10A. To obtain the communications log information for a specific time range, the user at the request terminal 10A selects a specific month, for example, "2010-09" from the pull-down menu 1003, using an input device such as the keyboard 211 or mouse 212. The input apparatus 40 sends a request for obtaining the communications log information with information regarding the selected month to the request terminal 10A. The request terminal 10A sends a request for obtaining the communications log information with the terminal ID "110001" of the request terminal 10A and the requested time range "2010-09" to the management system 50. The management system 50 searches the formatted log storage 547 for the extracted formatted log data group IG that matches the user request as described above, and sends the search result to the request terminal 10A. The request terminal 10A causes the external input apparatus 40 to display the screen 1000 onto the display 208, based on the search result transmitted from the management system 50.

In alternative to selecting the specific month as the requested time range by the pull-down menu 103, the user at the request terminal 10A may switch the specific month by selecting any one of the arrows provided at right side and left side of the pull-down menu 103. When the user selects the left-side arrow, a month previous to the month displayed in the pull-down menu 1003 is selected. When the user selects the right-side arrow, a month next to the month displayed in the pull-down menu 1003 is selected.

In case the formatted log data of a conference session having the participated date/time and the leave date/time that belong to different months is obtained, the communications log information is generated based on the extracted formatted log data as follows for display onto the screen. For the descriptive purposes, it is assumed that the participated date/time is "2010-08-30 22:00:00" and the leave date/time is "2010-10-01 10:00:00" for the conference session having the same conference ID.

In one example case, the communications log information is generated and displayed based on the extracted formatted log data such that the communications log information does not differ among the months. For example, the communications log information for the month of August is displayed with the participated date/time "2010-08-30 22:00:00" and the leave date/time "2010-10-01 10:00:00". The communications log information for the month of September is displayed with the participated date/time "2010-08-30 22:00:00" and the leave date/time "2010-10-01 10:00:00". The communications log information for the month of October is displayed with the participated date/time "2010-08-30 22:00:00" and the leave date/time "2010-10-01 10:00: 00".

In another example case, the communications log information is generated and displayed based on the extracted formatted log data such that the date/time fields of the communications log information are classified by month. More specifically, the formatted log data that extends over different months is trimmed by the beginning or end of a specific month before being displayed as the communications log information for the specific month. This trimming process may be performed by the supplementary function 552 of the terminal set utility server 550 or the search 542 of the log management server 540. For example, the communications log information for the month of August is displayed with the participated date/time "2010-08-30 22:00:00", and the leave date/time "2010-08-31 23:59:59". The communications log information for the month of September is displayed with the participated date/time "2010-09-01 00:00:00", and the leave date/time "2010-09-30 23:59:59". The communications log information for the month of October is displayed with the participated date/time "2010-10-01 00:00:00" and the leave date/time "2010-10-01 10:00:00".

In another example case, the communications log information is generated and displayed based on the extracted formatted log data such that the date/time fields of the communications log information are classified by month. More specifically, the formatted log data that extends over different months is trimmed by the beginning or end of a specific month before being displayed as the communications log information for the specific month. This trimming process may be performed by the supplementary function 552 of the terminal set utility server 550 or the search 542 of the log management server 540. In this example, instead of displaying a specific value of the participated date/time or the leave date/time that corresponds to the beginning or end of the specific month, a mark indicating continuation of the participation time is displayed. For example, the communications log information for the month of August is displayed with the participated date/time "2010-08-30 22:00:00" and the leave date/time "→". The communications log information for the month of September is displayed with the participated date/time "←", and the leave date/time "→". The communications log information for the month of October is displayed with the participated date time "←", and the leave date/time "2010-10-01 10:00:00".

As described above, the management system 50 applies format processing to the raw log data to generate the formatted log data and store the formatted log data, before a request for obtaining communications log information is received from the request terminal 10. When the request for obtaining communications log information is received, the management system 50 provides the formatted log data, which is previously prepared, to the request terminal 10, without causing the user at the request terminal 10 to wait for a long time period.

Further, as described above, the participated date/time of a conference session and the leave date/time of the conference session may be in different months. In such case, the management system 50 receives raw log data having the communication state data "join" and raw log data having the communication state data "leave", with the communication date/time fields that belong to different months. Assuming that the conference session starts in August and ends in October, and the user requests to obtain the communications log information for the month of September, if the management system 50 were to search through the raw log data with the communication date/time that matches the month of "September", none of the raw log data having the "join" communication state data and the raw log data having the "leave" communication state data is extracted as both of the raw log data are out of a requested time range of "September". In order to find for the raw log data having the "join" communication state data, the management system 50 searches the raw log data for the previous month "August" to specify one raw log data having the terminal ID of the request terminal 10A and the specific conference session ID. Further, to find for the raw log data having the "leave" communication state data, the management system 50 searches the raw log data for the following month "October" to specify one raw log data having the terminal ID of the request terminal 10A and the specific conference session ID. This searching may be performed for any previous or following month until one record is found. This may take a long time based on assumption that the raw log data is stored for a large number of terminals for a long time period.

Rather than spending a long time in searching, the management system 50 generates the formatted log data based on the raw log data before the request for obtaining communications log information is received from the request terminal 10A. For example, as described above referring to FIG. 11, the management system 50 processes the raw log data into the formatted log data in realtime as the raw log data stored in the temporary storage is detected. More specifically, the management system 50 applies format processing to the raw log data when the raw log data satisfies a format start condition that is previously determined to generate the formatted log data. The format processing to be applied is previously determined such that the formatted log data, after being processed, shows information regarding a conference or a conference session that has been performed or being performed by each of the terminals 10 in a manner that is interpretable to the end user. The formatted log data that is generated is stored. With the formatted log data, when the request for obtaining communications log information is received, the management system 50 easily searches the formatted log data that is stored to extract formatted log data that matches the request with less searching time.

Further, when the request for obtaining communications log information is received, the management system 50 does not have to edit the formatted log data in a form that is interpretable to the end user as the formatted log data has been already formatted in a manner that is interpretable to the end user, thus reducing the time otherwise needed for editing. The management system 50 or the request terminal 10 can easily generate communications log information based on the extracted formatted log data for display to the user.

Further, in case the request for obtaining communications log information for a specific time range is received from the user, the management system 50 searches the formatted log data to easily extract formatted log data that matches the requested time range, and provides the extracted formatted log data to the user. For example, the management system 50 extracts formatted log data having a range of participation time period that is overlapped with the requested time range at least partially, from the formatted log data. The range of participation time is easily obtained from the formatted log data previously prepared. Using the range of participation time of the formatted log data, the management system 50 easily extracts the formatted log data that matches the requested time range, even when the formatted log data has a participation time that extends over different months.

In the above-described examples, the formatted log data is created using the participant log management table t1 and the conference log management table t2. Alternatively, the formatted log data may be created in various other ways.

For example, the formatter 532 may format the raw log data into formatted participant log data to create a participant log management table t11 of FIG. 15A. The participant log management table t1 of FIG. 15A additionally includes an "incomplete flag" field in addition to the data fields of the participant log management table t1 of FIG. 10A. In a substantially similar manner, the formatter 532 may format the raw log data into formatted conference log data to create a conference log management table t12 of FIG. 15B. The conference log management table t12 of FIG. 15B additionally includes an "incomplete flag" field in addition to the data fields of the conference log management table t2 of FIG. 10B.

In prior to receiving the request for obtaining communications log information from the request terminal 10, the incomplete log remover 543 (FIG. 7) determines whether the formatted log data stored in the formatted log storage 547 is incomplete formatted log data E from which one or more data fields are missing. When the formatted log data I is not the incomplete formatted log data E, the incomplete log remover 543 enters into the "incomplete flag" field with a detection result "0". When the formatted log data I is the incomplete formatted log data E, the incomplete log remover 543 enters into the "incomplete flag" field with a detection result "1".

When the request for obtaining communications log information is received, the incomplete log remover 543 does not have to perform S23 of FIG. 12 to determine whether the extracted formatted log data I or the extracted formatted log data group IG is incomplete formatted log data E. Instead, the communication management server 510 refers to the participant log management table t11 or the conference log management table t12 to specify a record having the detection result "1" for the "incomplete flag" field. The incomplete formatted log data E with the detection flag of 1 is removed from the extracted formatted log data before the extracted formatted log data is sent to the terminal set utility server 550. This further reduces the overall processing time in processing the request for obtaining communications log information.

In this example, the detection result "0" and the detection result "1" are used to respectively indicate the normal formatted log data and the incomplete formatted log data E. Alternatively, any value may be used as the detection result. For example, the value "true" and the value "false" may be used to respectively indicate the normal formatted log data and the incomplete formatted log data E. In another example, the value "normal" and the value "incomplete"

may be used to respectively indicate the normal formatted log data and the incomplete formatted log data E.

Further, the management system 50 of FIG. 7 may be implemented in various other ways. For example, the temporary storage 529, the formatter 532, and the formatted log storage 547 may be integrated into one subsystem. The management system 50 may be provided with a plurality of such subsystems. The raw log data may be sequentially transferred to the temporary storages 529 in the subsystems, for example, using a message relay, to concurrently generate a plurality of types of formatted log data based on one type of raw log data.

In the above-described example referring to FIG. 7, the communication management server 510, the temporary storage server 520, the plurality of process servers 530, the log management server 540, and the terminal set utility server 550 are each implemented by a separate server such as a computer. Alternatively, these servers may be integrated into one server that may be implemented by a computer that functions as the management system 50. Alternatively, any part of the functions performed by these servers in the management system 50 may be grouped into any number of servers in the management system 50.

The relay terminal 30, the input apparatus 40, the management system 50, the program providing system 90, and the maintenance system 100 may be each implemented by a single computer. Alternatively, any number of parts, functions, or modules of the relay terminal 30, the management system 50, the program providing system 90, and the maintenance system 100 may be classified into a desired number of groups to be carried out by a plurality of computers. In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

A recording medium storing any one of the terminal control program, relay control program, input apparatus control program, and communication management program, or a storage device such as the HDD 204 that stores any one of the terminal control program, relay control program, input apparatus control program, and communication management program, or the program providing system 90 provided with the HD 204 storing any one of the terminal control program, relay control program, input apparatus control program, and communication management program, may be distributed within the country or to another country as a computer program product.

In the above-described examples, the communication system 1 of FIG. 1 is treated as a videoconference system. Alternatively, the transmission system 1 of FIG. 1 may be implemented as a teleconference system such as the IP teleconference system or the Internet teleconference system. Alternatively, the transmission system 1 of FIG. 1 may be implemented as a car navigation system. For example, the request terminal 10 may be implemented as a car navigation system that is installed onto an automobile. The counterpart terminal 10 may be implemented as a management terminal or server at a management center that manages the car navigation system or a car navigation system that is installed onto another automobile.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in a management system that manages log information relating to the communication state of a terminal. The management system includes: receiving means for receiving raw log data relating to a log of the communication state of the terminal, from the terminal; and format processing means for applying format processing to the raw log data to generate formatted log data. The receiving means receives a request for obtaining log information of a terminal from the terminal. The format processing means applies the format processing to the raw log data to generate the formatted log data before the receiving means receives the request for obtaining log information from the terminal. For example, the receiving means corresponds to a data transmit/receive 511 or a data transmit/receive 551 of the management system 50. The format processing means corresponds to a formatter 532 of the management system 50.

The management system further includes: format rule managing means for managing communication state data indicating a communication state of the terminal in association with format processing information indicating a type of format processing to be applied to raw log data. The format processing means searches the format rule managing means using communication state data included in the raw log data received by the receiving means to extract format processing information that is associated with the communication state data included in the raw log data, and formats the raw log data into the formatted log data as specified by the extracted formatted processing information. For example, the format rule managing means corresponds to the format rule manager 539 of the management system 50.

When the request for obtaining log information is received, the management system further searches the formatted log data to extract formatted log data that matches the request to obtain extracted formatted log data. The management system further includes: incomplete log removing means for checking whether the extracted formatted log data that matches the request for obtaining the log information includes incomplete formatted log data from which one or more data items that are supposed to be included in complete formatted log data are missing, and removes the incomplete formatted log data from the extracted formatted log data that matches the request. The management system provides the extracted formatted log data from which the incomplete formatted log data is removed, to the terminal. For example, the incomplete log removing means corresponds to the incomplete log remover 543 of the management system 50.

Alternatively, before the request for obtaining log information is received from the terminal, the format processing means causes the incomplete remover to determine whether the formatted log data is incomplete formatted log data from which one or more data items that are supposed to be included in complete formatted log data are missing to generate a detection result. The formatted log storing means stores information indicating the detection result in association with the formatted log data. For example, the formatted log storing means corresponds to the formatted log storage 547 of the management system 50.

The management system further includes temporary storage means for temporarily storing the raw log data received at the receiving means. The format processing means applies format processing to the raw log data read out from the temporary storage means to generate the formatted log data. For example, the temporary storage means corresponds to the temporary storage 529 of the management system 50.

The management system further includes formatted log storage means for storing the formatted log data generated by the format processing means. For example, the formatted log storage means corresponds to the formatted log storage 547 of the management system 50. When the format processing means determines that storing of the formatted log data in the formatted log storage means fails, for example, due to a communications error, the format processing means sends the raw log data that is unprocessed back to the temporary storage means.

The management system further includes raw log storage means for storing the raw log data read out from the temporary storage means. Before determining whether the format processing is to be applied to the raw log data, the format processing means stores the raw log data read out from the temporary storage in the raw log storage means. For example, the raw log storage means corresponds to the raw log storage 548 of the management system 50.

When the format processing means determines that storing of the raw log data in the raw log storage means fails, for example, due to a communications error, the format processing means sends the raw log data that is unprocessed back to the temporary storage means.

The management system further includes: incomplete raw log storage for storing incomplete raw log data. The format processing means further determines whether the raw log data to be processed is incomplete raw log data from which one or more data items that are supposed to be included in complete raw log data are missing. When the format processing means determines that the raw log data is incomplete raw log data, the format processing means stores the incomplete raw log data in the incomplete raw log storage. For example, the incomplete raw log storage corresponds to the incomplete raw log storage 549 of the management system 50.

The present invention may reside in a method of managing log information relating to the communication state of a terminal. The method includes: receiving raw log data relating to a log of the communication state of the terminal, from the terminal; applying format processing to the raw log data to generate formatted log data; receiving a request for obtaining log information of a terminal from the terminal. The applying format processing to the raw log data is performed before the receiving the request for obtaining log information.

The method further includes: managing communication state data indicating a communication state of the terminal in association with format processing information indicating a type of format processing to be applied to the raw log data; extracting format processing information that is associated with communication state data included in the raw log data received by the receiving; and formatting the raw log data into the formatted log data as specified by the extracted formatted processing information.

The present invention may reside in a recording medium storing a plurality of instructions which, when executed by one or more processors, cause the one or more processors to perform any one of the above-described methods.

The present invention may reside in a program providing system that provides a computer-readable program for processing raw log data.

The present invention may reside in a maintenance system that maintains any one of the management systems described above.

The present invention may reside in a management system including: a temporary storage that stores information including communication state data indicating a communication state of a terminal that is received directly or indirectly from the terminal, as raw log data including the received communication state data; a format processor that applies format processing to the raw log data read out from the temporary storage to generate formatted log data; a formatted log storage that stores the formatted log data; and an interface that receives a request for obtaining communications log information of the terminal directly or indirectly from the terminal.

In one example, the format processor includes a plurality of format processors each applying format processing to the raw log data so as to concurrently generate the formatted log data based on the raw log data.

In one example, the temporary storage provides an asynchronous communications system for the terminal and the management system.

In one example, the management system further includes: a search processor that searches the formatted log data stored in the formatted log storage using information included in the request to obtain extracted formatted log data that matches the request. The interface outputs the extracted formatted log data directly or indirectly to the terminal in response to the request. For example, the request includes identification information for identifying the terminal that sends the request, and a requested time range from which the terminal requests to obtain communications log information. The search processor extracts the formatted log data having time information that falls within the requested time range at least partially. For example, the time information may include a participated time at which the terminal participates in a conference session, a leave time at which the terminal leaves from the conference session, and a range of time period from the participated time to the leave time.

In one example, the management system excludes incomplete formatted log data from the extracted formatted log data before outputting the extracted formatted log data. The incomplete formatted log data is any formatted log data that fails the integrity check.

In one example, the management system excludes incomplete raw log data from the raw log data read out from the temporary storage before applying format processing. The incomplete raw log data is any raw log data that is incomplete in terms of format or contents of data.

What is claimed is:

1. A management system, comprising:
a temporary storage that stores information including communication state data indicating a communication state of a terminal, the communication state data being received directly or indirectly from the terminal, as conference log data including the received communication state data;
a format processor that reads out the conference log data from the temporary storage, determines whether the received communication state data included in the conference log data matches one of a plurality of specific, predetermined communication states, and applies processing to remove incomplete log data to the conference log data read out from the temporary storage to generate formatted log data, when the received communication state data matches one of the plurality of specific, predetermined communication states, and does not apply processing to the conference log data when the received communication state data does not match the one of the plurality of specific predetermined communication states;
a formatted log storage that stores the formatted log data; and
a first interface that receives a request for obtaining the formatted log data of the terminal directly or indirectly from the terminal,
wherein the format processor applies the processing to remove incomplete log data to the conference log data to generate the formatted log data before the interface receives the request for obtaining the formatted log data.

2. The management system of claim 1, further comprising:
a search processor that searches the formatted log data stored in the formatted log storage using information included in the request to obtain extracted formatted log data that matches the request,
wherein the interface outputs the extracted formatted log data directly or indirectly to the terminal in response to the request.

3. The management system of claim 2, wherein the format processor further:
extracts format processing information that is associated with the received communication state data included in the conference log data, when the format processor determines that the received communication state data matches the one of the plurality of specific communication states; and
formats the conference log data into the formatted log data using the extracted format processing information.

4. The management system of claim 3, further comprising:
a processor that checks whether the extracted formatted log data that matches the request includes incomplete formatted log data from which one or more data items that are supposed to be included in complete formatted log data are missing, and removes the incomplete formatted log data from the extracted formatted log data that matches the request,
wherein the interface provides the extracted formatted log data from which the incomplete formatted log data is removed to the terminal.

5. The management system of claim 3, further comprising:
a processor that checks whether the formatted log data is incomplete formatted log data from which one or more data items that are supposed be included in complete formatted log data are missing to generate a detection result, and stores information indicating the detection result in association with the formatted log data in the formatted log storage,
wherein the processor removes formatted log data having the detection result indicating that the formatted log data is incomplete formatted log data, from the extracted formatted log data, and
wherein the interface provides the extracted formatted log data from which the incomplete formatted log data is removed to the terminal.

6. The management system of claim 3, wherein the format processor further determines whether storing of the formatted log data in the formatted log storage fails, and sends the conference log data that is unprocessed back to the temporary storage for storage when the format processor determines that storing of the formatted log data fails.

7. The management system of claim 6, further comprising:
a conference log storage that stores the conference log data read out from the temporary storage, before the format processor determines whether format processing is to be applied to the conference log data read out from the temporary storage,
wherein the format processor determines whether storing of the conference log data in the conference log storage fails, and sends the conference log data that is unprocessed back to the temporary storage for storage when the format processor determines that the storing of the conference log data fails.

8. The management system of claim 7, further comprising:
an incomplete conference log storage that stores incomplete conference log data,
wherein the format processor further checks whether the conference log data to be applied with the processing to remove incomplete log data is incomplete conference log data from which one or more data items that are supposed to be included in complete conference log data are missing, and stores the conference log data that is determined to be the incomplete conference log data in the incomplete conference log storage without applying the processing to remove incomplete log data.

9. The management system of claim 3, further comprising:
a second interface that receives the information including the communication state data indicating the communication state of the terminal, from the terminal.

10. The management system of claim 3, further comprising:
a second interface that generates communications log information based on the extracted formatted log data and sends the communications log information to the terminal.

11. The management system of claim 1, wherein the format processor does not apply the processing to remove incomplete log data to the conference log data read out from the temporary storage when the received communication state data is one of online, accept, and call.

12. A method of processing conference log data, comprising:

storing information including communication state data indicating a communication state of a terminal, the communication state data being received from the terminal in a temporary storage, as conference log data including the received communication state data;

reading out the conference log data from the temporary storage;

determining whether the received communication state data included in the conference log data matches one of a plurality of specific, predetermined communication states;

applying processing to remove incomplete log data to the conference log data read out from the temporary storage to generate formatted log data, only when the received communication state data matches one of the plurality of specific, predetermined communication states, and not applying processing to the conference log data when the received communication state data does not match the one of the plurality of specific predetermined communication states;

storing the formatted log data in a formatted log storage;

receiving a request for obtaining the formatted log data of the terminal from the terminal;

searching the formatted log data stored in the formatted log storage using information included in the request to obtain extracted formatted log data that matches the request; and outputting the extracted formatted log data to the terminal in response to the request.

13. The method of claim 12, further comprising:

extracting format processing information that is associated with the received communication state data included in the conference log data, when the determining determines that the received communication state data matches the one of the plurality of specific communication states; and formatting the conference log data into the formatted log data using the extracted format processing information.

14. The method of claim 13, further comprising:

checking whether the extracted formatted log data that matches the request includes incomplete formatted log data from which one or more data items that are supposed be included in complete formatted log data are missing;

removing the incomplete formatted log data from the extracted formatted log data that matches the request; and providing the extracted formatted log data from which the incomplete formatted log data is removed to the terminal.

15. The method of claim 13, further comprising:

checking whether the formatted log data is incomplete formatted log data from which one or more data items that are supposed be included in complete formatted log data are missing to generate a detection result;

storing information indicating the detection result in association with the formatted log data in the formatted log storage;

removing formatted log data having the detection result indicating that the formatted log data is incomplete formatted log data, from the extracted formatted log data; and providing the extracted formatted log data from which the incomplete formatted log data is removed to the terminal.

16. The method of claim 13, further comprising:

determining whether storing of the formatted log data in the formatted log storage fails; and sending the conference log data that is unprocessed back to the temporary storage for storage when the determining determines that storing of the formatted log data fails.

17. The method of claim 16, further comprising:

storing the conference log data read out from the temporary storage in a conference log storage, before it is determined whether format processing is to be applied to the conference log data read out from the temporary storage;

determining whether storing of the conference log data in the conference log storage fails; and sending the conference log data that is unprocessed back to the temporary storage for storage when the determining determines that storing of the conference log data fails.

18. The method of claim 17, further comprising:

checking whether the conference log data to be applied with the processing to remove incomplete log data is incomplete conference log data from which one or more data items that are supposed to be included in complete conference log data are missing; and storing the conference log data that is determined to be the incomplete conference log data in an incomplete conference log storage without applying the processing to remove incomplete log data.

19. The method of claim 13, further comprising:

extracting, from an associated memory using the extracted format processing information and the communication state data included in the conference log data, an associated data record, wherein the step of applying the processing to remove incomplete log data is performed using the extracted associated data record.

20. The method of claim 12, wherein the determining step further comprises determining whether the received communication state data matches one of the plurality of specific, predetermined communication states, the plurality of specific, predetermined communication states including invite, start, end, join, leave, and offline.

* * * * *